United States Patent
Miyachi et al.

(10) Patent No.: US 7,071,955 B2
(45) Date of Patent: Jul. 4, 2006

(54) COLOR DISPLAY DEVICE

(75) Inventors: Koichi Miyachi, Soraku-gun (JP);
Akihito Jinda, Kitakatsuragi-gun (JP);
Hidekazu Miyata, Nagoya (JP);
Kazunari Tomizawa, Soraku-gun (JP);
Makoto Shiomi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 231 days.

(21) Appl. No.: 10/156,632

(22) Filed: May 28, 2002

(65) Prior Publication Data

US 2003/0043165 A1 Mar. 6, 2003

(30) Foreign Application Priority Data

May 30, 2001 (JP) .......................... 2001-163344
Jan. 29, 2002 (JP) .......................... 2002-20599

(51) Int. Cl.
*G09G 5/10* (2006.01)

(52) U.S. Cl. ............................ 345/690; 345/72; 345/77; 345/83; 345/88

(58) Field of Classification Search ................. 345/55, 345/60, 75.2, 102, 72, 77, 83, 88, 89, 589–592, 345/600, 690; 348/630, 650, 631, 649, 671, 348/675; 358/443, 448, 518–523; 382/162, 382/166, 167
See application file for complete search history.

(56) References Cited

U.S. PATENT DOCUMENTS 5,075,767 A * 12/1991 Takaragi ............... 358/515
5,414,529 A * 5/1995 Terada et al. ............ 358/448
5,771,108 A * 6/1998 Ikeda et al. ............. 358/500
5,801,745 A * 9/1998 Wada et al. ............. 347/232
6,081,254 A * 6/2000 Tanaka et al. ............ 382/167

FOREIGN PATENT DOCUMENTS

| JP | 05-127635 | * | 5/1993 |
| JP | 06-291997 | * | 10/1994 |
| JP | 06-335013 | * | 12/1994 |
| JP | 09-247701 | | 9/1997 |
| JP | 10-240198 | | 9/1998 |
| JP | 02000112423 A | * | 4/2000 |

OTHER PUBLICATIONS

Korean Office Action dated Nov. 23, 2005.

* cited by examiner

*Primary Examiner*—Alexander Eisen
(74) *Attorney, Agent, or Firm*—Harness Dickey & Pierce, P.L.C.

(57) ABSTRACT

A color display device includes a shutter type color display and signal processing means. The signal processing means has color conversion processing means for increasing a gradation level of a color signal having the highest gradation level while decreasing a gradation level of a color signal having the lowest gradation level when the gradation levels of the plural color signals are not equal one another, and for outputting a color signal has been processed to the shutter type color display. Further, a color display having a reflective member or a diffuse transmission member provided on a display screen or in the vicinity of the display screen, a color plasma display, or a color field emission display can also be used instead of the shutter type color display. Thus, even when chroma of the color display is low, a display in high chroma can be ensured.

61 Claims, 10 Drawing Sheets

COLOR DISPLAY DEVICE

FIELD OF THE INVENTION

The present invention relates to a color display device including signal processing means, and in particular to a color display device including: a shutter type color display, a color display having a reflective member or a diffuse transmission member provided on a display screen or in the vicinity of the display screen, a color plasma display, or a color field emission display; and color conversion means for improving chroma.

BACKGROUND OF THE INVENTION

In recent years, color liquid crystal display devices having various types of signal processing circuits have been developed in order to improve image quality, particularly for a liquid crystal television.

For example, Japanese Unexamined Patent Publication No. 10-240198/1998 (Tokukaihei 10-240198 published on Sep. 11, 1998) discloses a color liquid crystal display device including a chromaticity adjustment circuit. When one or two of signals of a red image display digital signal (R signal), a green image display digital signal (G signal) and a blue image display digital signal (B signal) have different gradation values, the chromaticity adjustment circuit adds a signal (signals) of an arbitrary value not less than 1 to the one or two of signals having smaller gradation values.

An object of the invention of the foregoing publication is to adjust a color reproduction range without using different color filters.

However, in the invention of Japanese Unexamined Patent Publication No. 240198/1998, since the chromaticity adjustment circuit raises gradation values of the one or two signals having smaller gradation values, the color reproduction range (chromaticity range) of chromatic pixels is reduced as the chromaticity coordinates points of chromatic pixels move to a white side as shown in FIG. 3 and FIG. 7 of the foregoing publication. Thus, chromaticity of the chromatic pixels is shifted closer to the white side, and chroma is decreased.

Further, the invention of the Japanese Unexamined Patent Publication No. 240198/1998 made it possible to adjust the color reproduction range; however, in a color liquid crystal display device, it is not possible to widen the color reproduction range of primary colors by controlling signal processing. This is because it is not possible to obtain luminance of more than 100% with respect to each pixel by controlling signal processing. In contrast, it is possible to reduce the color reproduction range, as shown in FIG. 3 and FIG. 7 of the foregoing publication. Namely, the invention of the Japanese Unexamined Patent Publication No. 240198/1998 only made it possible to correct the deviated white balance due to irregularities of color filters.

Meanwhile, in a shutter type color display such as a liquid crystal display, generally, light is not fully shaded by a light shutter, and chroma (color purity) is excessively reduced at a dark gradation because of the leakage of light.

Namely, for example, a contrast of a color liquid crystal display is about 300 in a general transmission type, and about 10 in a general reflection type. Accordingly, luminance of black display is about $1/10$ or $1/300$ when luminance of white display is 1, namely, black display of the color liquid crystal display device is not pure black display (luminance 0). Further, since external light reflects/scatters on a display screen of the color liquid crystal display in actual use environment, luminance of black display tends to further increase (the contrast tends to further decreases). Consequently, chroma of an image displayed in this general color liquid crystal display is low (the color is faded) compared to an ideal image display (an original image before it is reproduced, in the case of a television). In other words, the chromaticity coordinates points move to the white side. Further, many of the color liquid crystal display devices display a color image by separating colors with color filters. In this type of display devices, transmittance conflicts with color purity. Namely, for example, the use of highly colored filters improves chroma and color reproduction (color is enhanced) but decreases transmittance. On the other hand, in order to increase transmittance for higher luminance and lower power consumption (in the case of having a light source), it is necessary to use lightly colored filters, and therefore chroma (color purity) will decrease.

Accordingly, it has revealed that there has been a problem of a decrease in chroma (fading of color) in the color liquid crystal display device using color filters, which is caused by two facts:

(1) black display is not pure black display, (2) color purity decreases when transmittance is increased.

Further, a projection type color display, a color electroluminescence display, a color plasma display and a color field emission display, which are lately receiving much public attention, also have the problem of a decrease in chroma.

Namely, chroma decreases due to reflection and scattering of external light especially in the case of dark display, in a color display having a reflective member or a diffuse transmission member on the display screen or in the vicinity of the display screen, such as a front projection type color display which projects a light beam toward a front surface of a reflection screen, a back projection type color display which projects a light beam from the back of a diffuse transmission screen, and a color electroluminescence display which has a reflective electrode in the vicinity of the back of a fluorescence layer.

In the case of a back projection type color display, the external light is scattered on the screen and a part of the light can be seen by an observer even in the case of black display since the display screen (projection screen) itself is made of a diffusing member, thereby decreasing the contrast. Further, in the case of a front projection type color display, the external light is reflected on the screen and the contrast decreases even in the case of black display since the display screen itself is made of a reflective member, thereby decreasing chroma (color purity).

Note that, in the projection type display, the black display is a dark screen normally recognized as a white screen but having no projection light thereon, and a white screen is a screen in which light is projected to the foregoing screen.

Further, in the electroluminescence display having a back electrode in the vicinity of the back of a fluorescence layer, this back electrode is often made of a reflective electrode such as aluminum. In the color electroluminescence display having the reflective electrode as the back electrode, the external light is reflected on the back electrode and the contrast decreases even in the case of black display, thereby decreasing chroma (color purity).

Further, a display adopting an excited fluorescence body such as a plasma display or a field emission display also have a problem of decrease in luminance with increase in color purity of the fluorescence body. Namely, in order to ensure high luminance of a display, a fluorescence body having low color purity and high luminance should be adopted. However, in this display, chroma will decrease. Accordingly, in order to realize a display having desirable color reproduction by adopting the fluorescence body having low color purity and high luminance, chroma is required to be increased (enhanced). As described, a problem of decrease in chroma is found in (1) a shutter type color display such as a color liquid crystal display, (2) a projection type display or an electroluminescence display having a reflective member or a diffuse transmission member in the display screen or in the vicinity of the display screen, (3) a color plasma display, and (4) a color field emission display.

Therefore, the chromaticity adjustment circuit of the Publication No. 240198/1998 (Tokukaihei 10-240198) will further decrease chroma in those displays against the original purpose.

SUMMARY OF THE INVENTION

The present invention is made in view of the foregoing conventional problems, and an object is to provide a color display device capable of ensuring a display in high chroma, with respect to one of the various types of color display devices (1) through (4) which respectively include a color display and signal processing means.

In order to solve the foregoing problems, a color display device according to the present invention includes:

a shutter type color display which has a light shutter for adjusting light from a light source (a backlight having an constant luminance, or an external light source such as the sun, etc.) so as to display an image;

signal processing means for processing a color image signal which is made up of plural color signals respectively indicating each gradation level of the plural colors, and for outputting a color image signal which has been processed to the shutter type color display, wherein:

the signal processing means includes color conversion processing means for increasing a gradation level of a color signal having the highest gradation level, while decreasing a gradation level of a color signal having the lowest gradation level, when the gradation levels of the plural color signals are not equal one another.

With the foregoing arrangement, the image quality can be improved by enhancing half tones. Namely, it is possible to increase the gradation level of the highest color signal, while decreasing the gradation level of the lowest color signal with respect to the image signals of half tone having plural color signals at different ratios. Further, it is possible to increase the gradation levels with respect to image signals of primary colors (original colors). On the other hand, the gradation levels do not vary with respect to image signals of achromatic colors having each color at the equal ratios (having the equal gradation levels). Consequently, color purity (chroma) increases. Namely, a reddish color becomes a reddish color closer to a primary red, or can become a primary red. Thus, high chroma is ensured even when chroma of the shutter type color display is low.

Furthermore, by using color filters in low color purity and high transmittance for the shutter type color display, luminance and chroma of the display increase without increasing light quantity of the light source.

Note that, a typical example of the shutter type color display is a liquid crystal display, such as a transmission type color liquid crystal display in which the liquid crystal adjusts light from a backlight provided on the backside of the liquid crystal, a reflection type color liquid crystal display in which the liquid crystal adjusts an external light reflected by a reflector on the backside of the liquid crystal, and a semi-transmission type color liquid crystal display (transmission and reflection type color liquid crystal display) which includes a semi-transmission reflector on the backside of the liquid crystal and a backlight on the backside of the semi-transmission reflector, and displays an image using the external light in a light environment and using the backlight in a dark environment.

The color conversion processing according to the present invention can improve the image quality of the transmission type color liquid crystal display by increasing chroma, since this color liquid crystal display normally has a contrast of around 300 and also has a tendency of color fading (a decrease of chroma) due to reflection of external light on the display screen. The color conversion processing according to the present invention also can improve the image quality of the reflection type color liquid crystal display by increasing chroma, since this color liquid crystal display normally has a contrast of around 10 and has a tendency of color fading (a decrease of chroma) which decrease color purity. Therefore, it is possible to improve chroma of the semi-transmission type color liquid crystal display by the color conversion processing according to the present invention, since this color display has the same characteristics as those of the two color liquid crystal display devices.

Further, electro-chromic display can be named as a typical example of the shutter type color display device. Electro-chromic is a technology which uses oxidation-reduction due to potential difference for changing a state of material so as to vary color and transmittance. A display uses this technology, namely an electro-chromic display can be used as the shutter type color display device.

Further, in order to solve the foregoing problems, a color display device according to the present invention includes:

a color display having a reflective member or a diffuse transmission member provided on a display screen or in the vicinity of the display screen;

signal processing means for processing a color image signal which is made up of plural color signals respectively indicating each gradation level of the plural colors, and for outputting a color image signal which has been processed to the color display, wherein:

the signal processing means includes color conversion processing means for increasing a gradation level of a color signal having the highest gradation level, while decreasing a gradation level of a color signal having the lowest gradation level, when the gradation levels of the plural color signals are not equal one another.

With the foregoing arrangement, it is possible to increase the gradation level of the highest color signal, while decreasing the gradation level of the lowest color signal with respect to the image signals of half tone having plural color signals at different ratios. Further, it is possible to increase the gradation values with respect to image signals of primary colors. On the other hand, the gradation values do not vary with respect to image signals of achromatic colors having each color at the equal ratios (having the equal gradation levels). Consequently, color purity (chroma) increases, and high chroma is ensured even when chroma of the color display is low.

Furthermore, by using color filters in low color purity and high transmittance for the color display having a reflective member or a diffuse transmission member provided on a display screen or in the vicinity of the display screen, luminance and chroma of the display increase without increasing light quantity of the light source.

As a typical example of the color display having a reflective member or a diffuse transmission member provided on a display screen or in the vicinity of the display screen, known is a projection type color display which projects light beam on the reflection screen as a reflection member, or a diffuse transmission screen (display screen) as a diffuse transmission member, and an electroluminescence display which has a fluorescence layer (display screen) and a reflective electrode as a reflective member in the vicinity of the back of the fluorescence layer.

The projection type color displays of various kinds, such as the one adopting a liquid crystal display element (a liquid crystal panel) or the one adopting a digital micro mirror device (DMD), have a tendency of a decrease of chroma (fading of color) since external light reflects or diffuses on the screen. In this type of color displays, chroma increases by adopting the color conversion processing according to the present, and the image quality will improve. Further, the electroluminescence display has a tendency of a decrease of chroma (fading of color) since the bus line and/or the back electrode (pixel electrode) is generally made of a metal, which is likely to reflect external light. In this type of color display, chroma increases by adopting the color conversion processing according to the present invention, and the image quality will improve.

Further, in order to solve the foregoing problems, a color display device according to the present invention includes:

a color plasma display;

signal processing means for processing a color image signal which is made up of plural color signals respectively indicating each gradation level of the plural colors, and for outputting a color image signal which has been processed to the color plasma display, wherein:

the signal processing means includes color conversion processing means for increasing a gradation level of a color signal having the highest gradation level, while decreasing a gradation level of a color signal having the lowest gradation level, when the gradation levels of the plural color signals are not equal one another.

Further, in order to solve the foregoing problems, a color display device according to the present invention includes:

a color field emission display;

signal processing means for processing a color image signal which is made up of plural color signals respectively indicating each gradation level of the plural colors, and for outputting a color image signal which has been processed to the color field emission display, wherein:

the signal processing means includes color conversion processing means for increasing a gradation level of a color signal having the highest gradation level, while decreasing a gradation level of a color signal having the lowest gradation level, when the gradation levels of the plural color signals are not equal one another.

The color plasma display and the color field emission display excite a fluorescence body to display an image. These color display consume great power, and the power consumption cannot be reduced if color purity is increased.

With the foregoing arrangement, it is possible to increase the gradation level of the highest color signal, while decreasing the gradation level of the lowest color signal with respect to the image signals of half tone having plural color signals at different ratios. Further, it is possible to increase the gradation values with respect to image signals of primary colors. On the other hand, the gradation values do not vary with respect to image signals of achromatic colors having each color at the equal ratios (having the equal gradation values). Consequently, color purity (chroma) increases, and high chroma is ensured even when chroma of the color display is low.

Furthermore, by providing the color conversion processing means in the color plasma display and the color field emission display, high chroma (intense color) can be maintained while moderating luminance of fluorescence body. Therefore, it becomes possible to reduce power consumption while maintaining a desirable level of display quality in actual use.

Additional objects, features, and strengths of the present invention will be made clear by the description below. Further, the advantages of the present invention will be evident from the following explanation in reference to the drawings.

DESCRIPTION OF THE EMBODIMENTS

[Embodiment 1]

Figure 1:
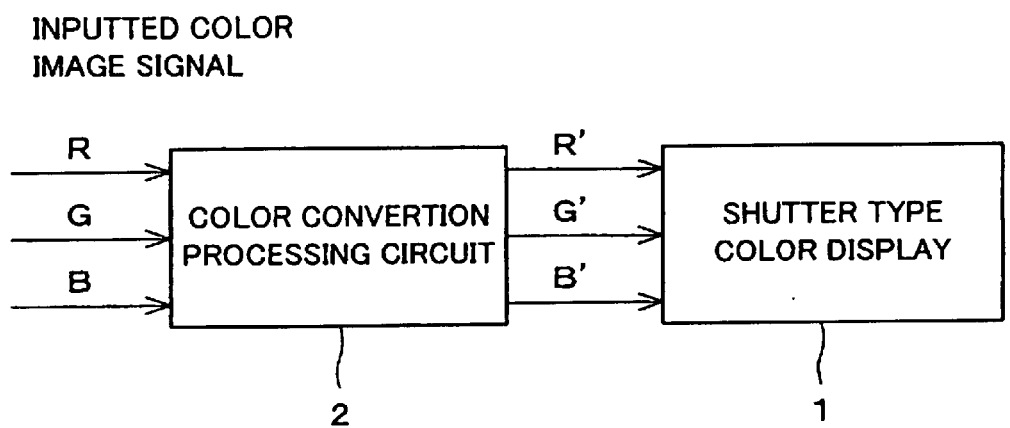
FIG. 1 is a block diagram schematically showing an arrangement of a color display device according to one embodiment of the present invention.

The following will explain one embodiment of the present invention with reference to FIG. 1.

As shown in FIG. 1, a color display device of the present embodiment includes:

a shutter type color display 1 which adjusts light from a light source, such as the sun or room lighting, according to a color image signal so as to display an image;

a color conversion processing circuit (signal processing means, color conversion processing means) 2 which processes a color image signal made up of a red signal indicating gradation levels of red, a green signal indicating gradation levels of green, a blue signal indicating gradation levels of blue, then outputs the converted color image signal including the red signal, the green signal and the blue signal to the shutter type color display 1.

When the gradation levels of R, G, and B of the inputted color image signal are not equal, the color conversion processing circuit 2 increases the gradation level of the color signal (one or two signals of the color signals of R, G, and B) having the highest gradation level while decreasing the gradation level of color signal (one or two signals among the color signals of R, G, and B) having the lowest gradation level.

The inputted color image signal is made up of the signals of R, G and B respectively having N gradation values (from 0 (black) to N−1 (white)). Namely, the inputted image signal is a color digital signal of 3n bit, and made up of a digital signal (red signal) R having N gradation values of n bit ($N=2^n$), which shows the gradation value of red as an integer value (gradation value) r (from 0 (the lowest gradation value; black) to N−1 (the highest gradation value; white)), a digital signal (green signal) G having N gradation values of n bit ($N=2^n$), which shows the gradation value of green as an integer value (gradation value) g (from 0 (the lowest gradation value; black) to N−1 (the highest gradation value; white)), and a digital signal (blue signal) B having N gradation values of n bit ($N=2^n$), which shows the gradation value of blue as an integer value (gradation value) b (from 0 (the lowest gradation value; black) to N−1 (the highest gradation value; white)). The color conversion processing circuit 2 converts the values r, g and b, which are the gradation values of R, G and B of the inputted color image signal, to the values r', g' and b' which are the gradation values calculated by the following equations. (Note; when a calculation result is a minus value, it is denoted by 0)

$$r'=r+Krg(r-g)+Krb(r-b)$$

$$g'=g+Kgr(g-r)+Kgb(g-b)$$

$$b'=b+Kbr(b-r)+Kbg(b-g)$$

(Note; Krg, Krb, Kgr, Kgb, Kbr and Kbg are positive constants)

Then, the color conversion processing circuit 2 outputs a red signal R', a green signal G' and a blue signal B' which respectively have the gradation values of r', g' and b' to the shutter type color display 1 as an outputted color image signal.

It is preferable that Krg, Krb, Kgr, Kgb, Kbr and Kbg are not more than 2, and further preferably, not more than 0.5.

Further, it is preferable that Krg, Krb, Kgr, Kgb, Kbr and Kbg are constants denoted by $1/2^n$ (n is an integer).

In this manner, a smaller-scale circuit can be used for the color conversion processing circuit 2. Because this color image signal is a digital signal of a binary number, and the calculation of multiplying the digital signal by $1/2^n$ (n is an integer) is easily performed by a shift (digits control). For example, a calculation of multiplying a digital signal of n bit (n>3) by $1/2^3$ (=0.125) can be performed by deleting the 3 last digits, and shifting remaining digits to the right by 3 positions for the 3 first digits to be "000". Further, a calculation of multiplying a digital signal of n bit (n>2) by $1/2^2$ (=0.25) can be performed by deleting the 2 last digits, and shifting remaining digits to the right by 2 positions for the 2 first digits to be "00".

Further, for example, in the case of the following equations;

$$Krg=Krb=0.125=1/2^3$$

$$Kgr=Kgb=0.25=1/2^2$$

$$Kbr=Kbg=0.125=1/2^3$$

an inputted color image signal made up of color signals of R, G, and B which are digital signals of "200", "120", and "100" (in decimal) having 256 gradation levels of 8 bit is converted to an outputted color image signal made up of color signals of R, G, and B which are digital signals of "222", "105", and "85" (in decimal). With this manner, reddish half tone will be converted to half tone closer to primary red.

[Embodiment 2]

Figure 2:
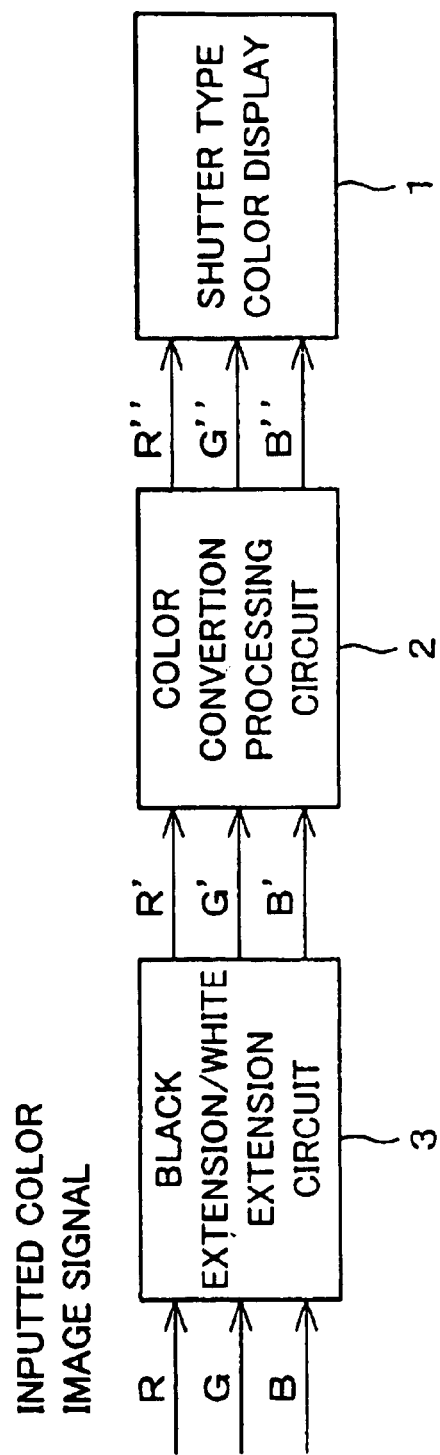
FIG. 2 is a block diagram schematically showing an arrangement of a color display device according to another embodiment of the present invention.

The following will explain another embodiment of the present invention with reference to FIG. 2. For ease of explanation, materials having the equivalent functions as those shown in the drawings pertaining to Embodiment 1 above will be given the same reference symbols, and explanation thereof will be omitted here.

As shown in FIG. 2, a color display device of the present embodiment is the same as that of Embodiment 1 except for an additionally provided black extension and white extension circuit (signal processing means, black extension and white extension means) 3.

The performance of the color conversion processing circuit 2 is also the same as that of the first embodiment except for its signal processing with respect to a color image signal outputted from the black extension and white extension circuit 3 instead of processing an inputted color image signal. Namely, the color conversion processing circuit 2 converts the values r', g' and b', which are the gradation values of R, G and B outputted from the black extension and white extension circuit 3, to the values r", g" and b" which are the gradation values calculated by the following equations. (Note; when a calculation result is a minus value, it is denoted by 0)

$$r''=r'+Krg(r'-g')+Krb(r'-b')$$

$$g''=g'+Kgr(g'-r')+Kgb(g'-b')$$

$$b''=b'+Kbr(b'-r')+Kbg(b'-g')$$

Then, the color conversion processing circuit 2 outputs a red signal R", a green signal G" and a blue signal B" which respectively have the gradation values of r", g" and b" to the shutter type color display 1 as an outputted color image signal.

The black extension and white extension circuit 3 converts the gradation values r, g and b of the red signal R, the green signal G and the blue signal B of the inputted color image signal to 0 when the gradation values are positive values not more than a first threshold x (a natural number not more than N−3), and converts the gradation values to 1 when the values are not less than a second threshold y (an integer greater than x but not more than N−2) but smaller than N−1. Further, when the gradation values r, g and b are greater than x but smaller than y, the black extension and white extension circuit 3 converts the values to the gradation values r', g' and b' according to the following functions.

$$r'=o(r)$$
$$g'=p(g)$$
$$b'=q(b)$$

(Note: o (r), p (g) and q (b) are functions increase from 0 to N−1 between x and y with respect to each of the R, G and B).

Then, the black extension and white extension circuit 3 outputs the red signal R', the green signal G' and the blue signal B' respectively having the converted gradation values r', g' and b' to the color conversion processing circuit 2.

The functions o (r), p (g) and q (b) of the present embodiment are denoted by the following equations.

$$o(r)=(N-1)\{(r-x)/(y-x)\}^z$$
$$p(g)=(N-1)\{(g-x)/(y-x)\}^z$$
$$q(b)=(N-1)\{(b-x)/(y-x)\}^z$$

Note that, z is an arbitrary positive constant, and a calculation result should be rounded down by the decimal point.

Accordingly, where t (=r, g and b) represents the gradation values of color signals R, G and B, and t' (=r', g' and b') represents the gradation values of color signals R', G' and B', the relation between t and t' are denoted as follows.

when $0 \leq t \leq x$, t'=0 when $x+1 \leq t \leq y-1$, t'=(N−1)(t−x)/(y−x)

and;

when $y \leq t \leq N-1$, t'=N−1

In the present embodiment, the black extension and white extension circuit 3 is provided so as to enhance contrast (color difference) of an image including half tones, thereby improving image quality.

Note that, the functions o (r), p (g) and q (b) are primary functions in the present embodiment; however, the functions o (r), p (g) and q (b) are not limited to those above, and any functions can be used which increase in the range of from 0 to N−1 between x and y with respect to each of the R, G and B. For example, exponential functions or trigonometric functions can also be used].

[Embodiment 3]

Figure 3:
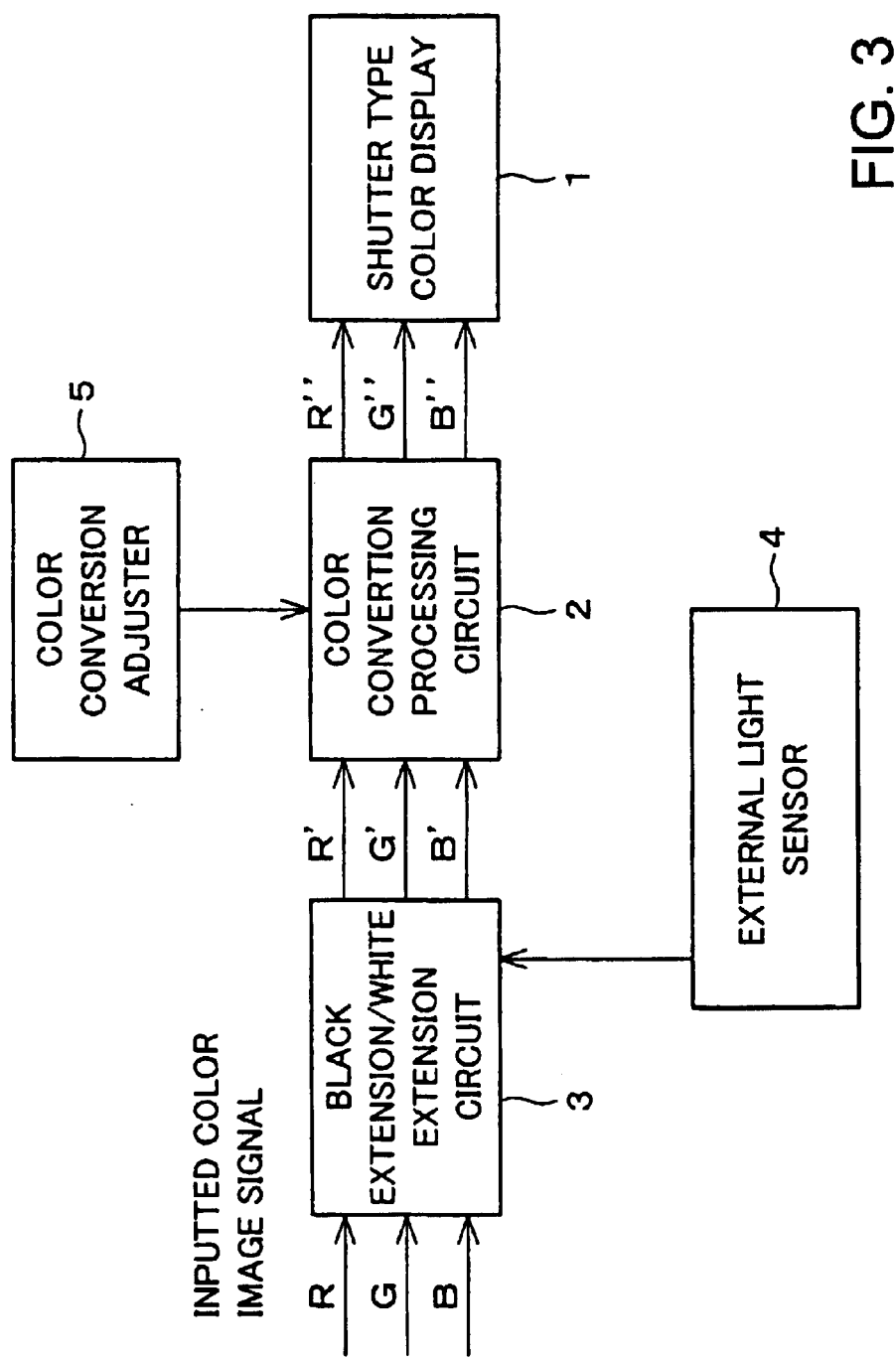
FIG. 3 is a block diagram schematically showing an arrangement of a color display device according to another embodiment of the present invention.

The following will explain another embodiment of the present invention with reference to FIG. 3. For ease of explanation, materials having the equivalent functions as those shown in the drawings pertaining to the first and second embodiments above will be given the same reference symbols, and explanation thereof will be omitted here.

As shown in FIG. 3, a color display device of the present embodiment is the same as that of Embodiment 2 except for an external light sensor (sensing means) 4 for sensing brightness of external light, and a color conversion adjuster (adjustment means) 5, which are additionally provided.

The color conversion processing circuit 2 converts the values r', g' and b', which are the gradation values of the color signals of R', G' and B' outputted from the black extension and white extension circuit 3, to the values r'', g'' and b'' which are the gradation values calculated by the following equations.

(Note; when a calculation result is a minus value, it is denoted by 0)

$$r''=r'+Krg(r'-g')+Krb(r'-b')$$
$$g''=g'+Kgr(g'-r')+Kgb(g'-b')$$
$$b''=b'+Kbr(b'-r')+Kbg(b'-g')$$

Then, the color conversion processing circuit 2 outputs a red signal R'', a green signal G'' and a blue signal B'' which respectively have the gradation values of r'', g'' and b'' to the shutter type color display 1 as an outputted color image signal.

In the present embodiment, Krg, Krb, Kgr, Kgb, Kbr and Kbg are variables of not less than 0, and are denoted by the following equations.

$$Krg=\beta \times \alpha r \times Crg$$
$$Krb=\beta \times \alpha r \times Crb$$
$$Kgr=\beta \times \alpha g \times Cgr$$
$$Kgb=\beta \times \alpha g \times Cgb$$
$$Kbr=\beta \times \alpha b \times Cbr$$
$$Kbg=\beta \times \alpha b \times Cbg$$

These Crg, Crb, Cgr, Cgb, Cbr and Cbg are variables of not less than 0, and vary according to g', b', r', b' r' and g', respectively. When Crg=i (g'), Crb=j (b'), Cgr=k (r'), Cgb=l (b'), Cbr=m (r'), Cbg=n (g'), i (g'), j (b'), k (r'), l (b'), m (r') and n (g') are functions denoted by the following equations.

$$i(g') = Crg'\{g'/(N-1)\}^k (g' < (N-1)/2)$$
$$= Crg'\{1 - g'/(N-1)\}^k (g' \geq (N-1)/2)$$
$$j(b') = Crb'\{b'/(N-1)\}^k (b' < (N-1)/2)$$
$$= Crb'\{1 - b'/(N-1)\}^k (b' \geq (N-1)/2)$$
$$k(r') = Cgr'\{r'/(N-1)\}^k (r' < (N-1)/2)$$
$$= Cgr'\{1 - r'/(N-1)\}^k (r' \geq (N-1)/2)$$
$$l(b') = Cgb'\{b'/(N-1)\}^k (b' < (N-1)/2)$$
$$= Cgb'\{1 - b'/(N-1)\}^k (b' \geq (N-1)/2)$$
$$m(r') = Cbr'\{r'/(N-1)\}^k (r' < (N-1)/2)$$
$$= Cbr'\{1 - r'/(N-1)\}^k (r' \geq (N-1)/2)$$
$$n(g') = Cbg'\{g'/(N-1)\}^k (g' < (N-1)/2)$$
$$= Cbg'\{1 - g'/(N-1)\}^k (g' \geq (N-1)/2)$$

(Note; k, Crg', Crb', Cgr', Cgb', Cbr' and Cbg' are positive constants)

Note that, the calculation result will be rounded down by the decimal point.

It is preferable that Crg', Crb', Cgr', Cgb', Cbr' and Cbg' are not more than 2, and further preferably, not more than 0.5. Further, it is preferable that Crg', Crb', Cgr', Cgb', Cbr' and Cbg' are constants denoted by $1/2^n$ (n is an integer). In this manner, a smaller-scale circuit can be used for the color conversion processing circuit 2. Because this color image signal is a digital signal of a binary number, and calculation which multiplies the digital signal by $1/2^n$ (n is an integer) is easily performed by a shift.

The foregoing αr, αg and αb are variables of not less than 0, and vary according to r, g and b, respectively. When αr=f(r), αg=g(g) and αb=h(b), f(r), g(g) and h(b) are functions denoted by the following equations.

$$f(r) = f0\{r'/(N-1)\}^k \quad (r' < (N-1)/2)$$
$$= f0\{1 - r'/(N-1)\}^k \quad (r' \geq (N-1)/2)$$
$$g(g) = g0\{g'/(N-1)\}^k \quad (g' < (N-1)/2)$$
$$= g0\{1 - g'/(N-1)\}^k \quad (g' \geq (N-1)/2)$$
$$h(b) = h0\{b'/(N-1)\}^k \quad (b' < (N-1)/2)$$
$$= h0\{1 - b'/(N-1)\}^k \quad (b' \geq (N-1)/2)$$

(Note; f0, g0, h0 and k are positive constants) Note that, the calculation result will be rounded down by the decimal point.

It is preferable that f0, g0 and h0 are not more than 1. Further, it is preferable that f0, g0 and h0 are constants denoted by $1/2^n$ (n is an integer). In this manner, a smaller-scale circuit can be used for the color conversion processing circuit 2. Because this color image signal is a digital signal of a binary number, and calculation which multiplies the digital signal by $1/2^n$ (n is an integer) is easily performed by a shift.

As described, in the present embodiment, the values of Crg, Crb, Cgr, Cgb, Cbr and Cbg, and αr, αg and αb decrease as the values of r', g' and b' become closer to 0 or N−1, unlike Embodiment 1. In this manner, it becomes possible to lessen the gradation values of the color signals R, G and B of the color image signal from being saturated with the lowest value 0 or the highest value N−1 due to the signal processing of the color conversion processing circuit 2. Namely, chroma will not excessively increase (color will not be intense), by the color conversion processing circuit 2. Further, it becomes possible to prevent monotone or complementary colors from being processed to increase chroma (to be intense colors).

The black extension and white extension circuit 3 is substantially the same as that of Embodiment 2 except for a control function for the thresholds x and y, which controls x and y depending on the brightness of external light sensed by the external light sensor 4.

The color conversion adjuster 5 is an adjuster which enables a user to adjust the value of β to a desirable value in the range of from 0 to 1, inclusive. When β is 0, the function for increasing chroma (for making colors more intense) of the color conversion processing circuit 2 is off, and when β is 1, the function for increasing chroma (for making colors more intense) of the color conversion processing circuit 2 becomes maximum.

Note that, in the present embodiment, as for the functions f(r'), g(g'), h(b'), i(g'), j(b'), k(r'), l(b'), m(r') and n(g'), primary functions which increase are used in the range of from 0 to less than (N−1)/2, and primary functions which decrease are used in the range of from (N−1)/2 to N−1. However, the functions f(r), g(g) and h(b) are not limited to those above, and any functions can be used which increase in the range of from 0 to less than (N−1)/2, and decrease in the range of from (N−1)/2 to N−1. For example, exponential functions or trigonometric functions can also be used. Further, the functions r, g and b are discriminated by comparing with (N−1)/2; however, the threshold for this discrimination can vary. Further, primary functions which increase in the range between 0 and (N−1) can be used for the functions f(r'), g(g'), h(b'), i(g'), j(b'), k(r'), l(b'), m(r') and n(g') in some cases.

Further, in the present embodiment, a user can adjust the value of β to a desirable value by the color conversion adjuster 5; however, in many cases, image quality, which is visible by a user, improves when β increases proportionally with the brightness of external light.

Figure 4:
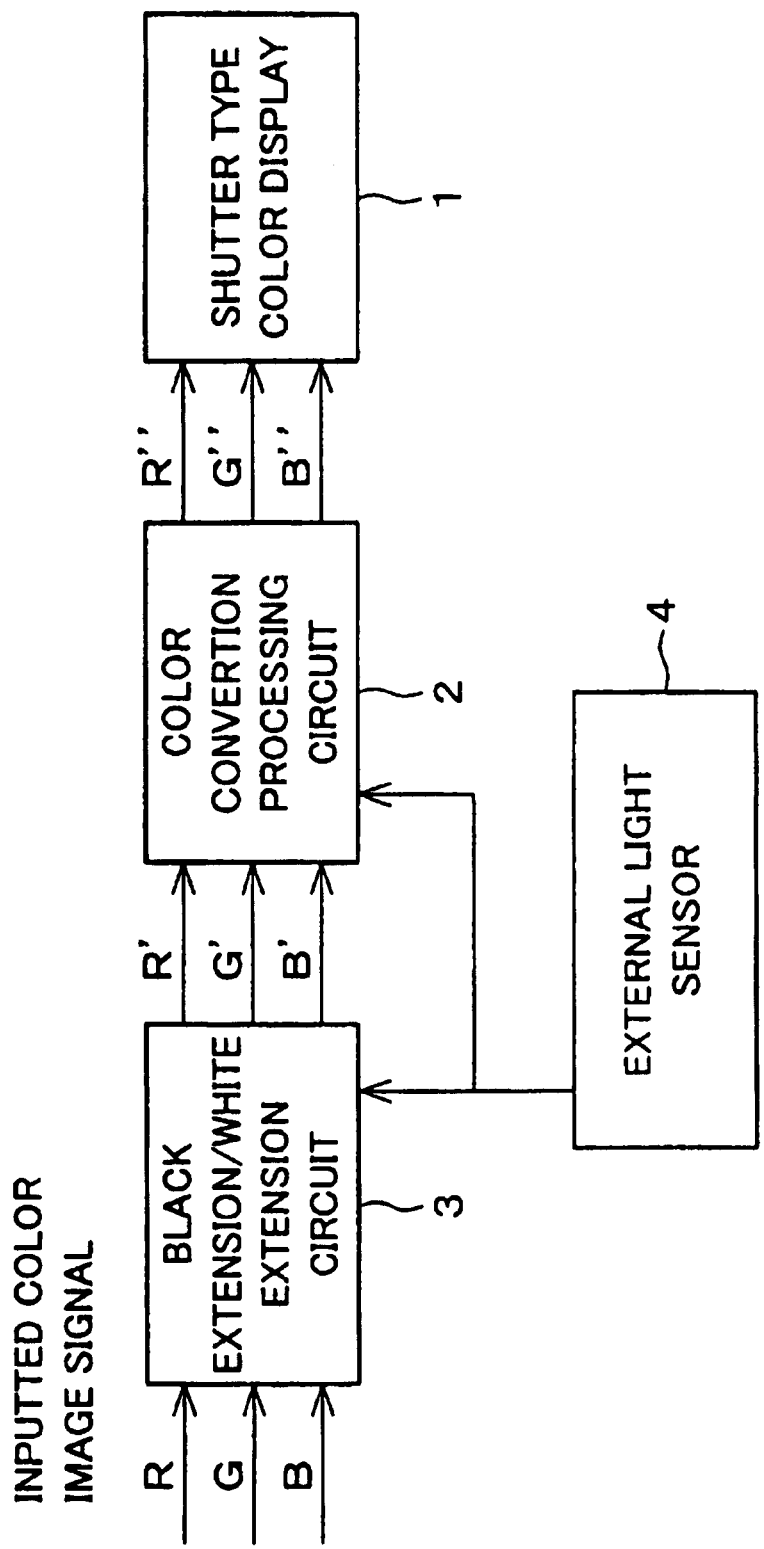
FIG. 4 is a block diagram schematically showing an arrangement of a color display device according to another embodiment of the present invention.

Accordingly, as shown in FIG. 4, the value of β may be automatically controlled in the range of from 0 to 1, inclusive, depending on the sensed result of the external light sensor 4, instead of providing the color conversion adjuster 5.

[Embodiment 4]

The following will explain still another embodiment of the present invention with reference to FIG. 1. For ease of explanation, materials having the equivalent functions as those shown in the drawings pertaining to Embodiment 1 above will be given the same reference symbols, and explanation thereof will be omitted here.

A color display device of the present invention has the same arrangement as that of Embodiment 1 except for its calculation operation by the color conversion processing circuit 2.

As with Embodiment 1, the color conversion processing circuit 2 of the present invention converts the values r, g and b, which are the gradation values of R, G and B of the inputted color image signal, to the values r', g' and b' which are the gradation values calculated by the following equations. (Note; when a calculation result is a minus value, it is denoted by 0)

$$r' = r + Krg(r-g) + Krb(r-b)$$
$$g' = g + Kgr(g-r) + Kgb(g-b)$$
$$b' = b + Kbr(b-r) + Kbg(b-g)$$

(Note; Krg, Krb, Kgr, Kgb, Kbr and Kbg are positive constants)

Then, the color conversion processing circuit 2 outputs a red signal R', a green signal G' and a blue signal B' which respectively have the gradation values of r', g' and b' to the shutter type color display 1 as an outputted color image signal.

The foregoing Krg, Krb, Kgr, Kgb, Kbr and Kbg are denoted by the following equations, which are different from those of Embodiment 1.

$$Krg = C \times \alpha r \times \alpha g$$
$$Krb = C \times \alpha r \times \alpha b$$
$$Kgr = C \times \alpha g \times \alpha r$$
$$Kgb = C \times \alpha g \times \alpha b$$
$$Kbr = C \times \alpha b \times \alpha r$$
$$Kbg = C \times \alpha b \times \alpha g$$

(C is a positive constant, and αr, αg and αb are variables of not less than 0, and vary according to r, g and b.)

The foregoing αr, αg and αb are variables of not less than 0, and vary according to r, g and b, and also are functions denoted by the following equations.

$$\alpha r = 2 \times r/(N-1) \quad (r < (N-1)/2)$$
$$= 2 \times (1-r)/(N-1) \quad (r \geq (N-1)/2)$$
$$\alpha g = 2 \times g/(N-1) \quad (g < (N-1)/2)$$

-continued $$a'b = 2 \times (1-g)/(N-1) \quad (g \geq (N-1)/2)$$

$$a'b = 2 \times b/(N-1) \quad (b < (N-1)/2)$$

$$= 2 \times (1-b)/(N-1) \quad (b \geq (N-1)/2)$$

Note that, the calculation result (the calculated values for r', g' and b') will be rounded down by the decimal point.

It is preferable that the constant C is not more than 2, and further preferably, not more than 0.5.

Further, it is preferable that the constant C can be denoted by $1/2^n$ (n is an integer). In this manner, a smaller-scale circuit can be used for the color conversion processing circuit 2. Because this color image signal is a digital signal of a binary number, and calculation which multiplies the digital signal by $1/2^n$ (n is an integer) is easily performed by a shift.

[Embodiment 5]

Figure 5:
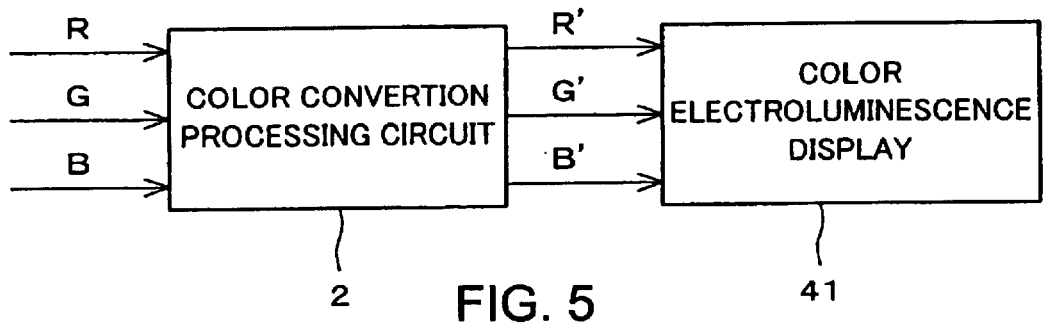
FIG. 5 is a block diagram schematically showing an arrangement of a color display device according to another embodiment of the present invention.

The following will explain another embodiment of the present invention with reference to FIG. 5. As shown in FIG. 5, a color display device of the present embodiment includes:

a color electroluminescence display 41 which has a fluorescence layer (not shown) as a display screen and a back electrode (not shown) as a reflective electrode provided on the backside of the fluorescence layer;

a color conversion processing circuit (signal processing means, color conversion processing means) 2 which processes a color image signal made up of a red signal indicating gradation levels of red, a green signal indicating gradation levels of green, a blue signal indicating gradation levels of blue, then outputs the converted color image signal including the red signal, the green signal and the blue signal to the color electroluminescence display 41.

The color conversion processing circuit 2 processes the color signals of R, G and B in the same manner as that of Embodiment 1. Further, the inputted color image signal of the present invention is also the same as that of Embodiment 1.

Accordingly, it is possible to convert an image signal of half tone, having a plurality of color signals at different rates, to a half tone closer to a primary color, thereby providing display in high chroma.

Note that, in the present embodiment, a color electroluminescence display was used as a color display having a reflective member or a diffuse transmission member provided on a display screen or in the vicinity of the display screen; however, the present embodiment is not limited to those, and may also be applied to such as a front projection type color display which projects a light beam toward a surface of a reflection screen, a back projection type color display which projects a light beam from the back of a diffuse transmission screen.

[Embodiment 6]

Figure 6:
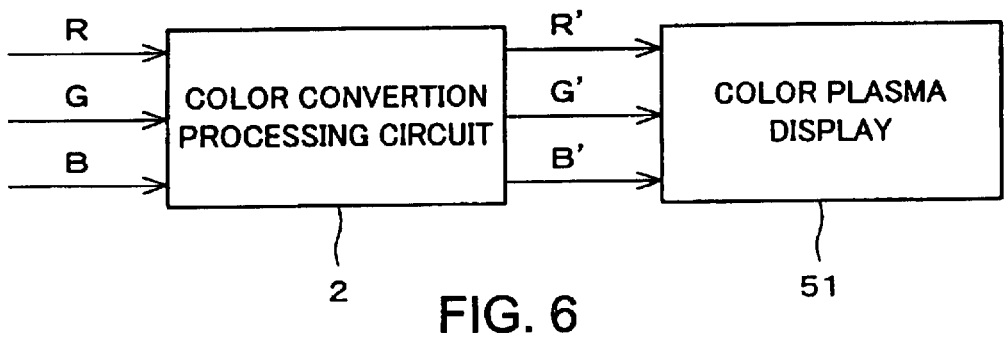
FIG. 6 is a block diagram schematically showing an arrangement of a color display device according to another embodiment of the present invention.

The following will explain another embodiment of the present invention with reference to FIG. 6. As shown in FIG. 6, a color display of the present invention includes:

a color plasma display 51 which uses light radiating with the discharge of noble gas;

a color conversion processing circuit (signal processing means, color conversion processing means) 2 which processes a color image signal made up of a red signal indicating gradation levels of red, a green signal indicating gradation levels of green, a blue signal indicating gradation levels of blue, then outputs the converted color image signal including the red signal, the green signal and the blue signal to the color plasma display 51.

The color conversion processing circuit 2 processes the color signals of R, G and B in the same manner as that of Embodiment 1. Further, the inputted color image signal of the present invention is also the same as that of Embodiment 1.

Accordingly, it is possible to convert an image signal of half tone, having a plurality of color signals at different rates, to a half tone closer to a primary color. Further, since high chroma (intense color) can be maintained while moderating luminance of fluorescence body, it becomes possible to reduce power consumption while maintaining a desirable level of display quality in actual use.

[Embodiment 7]

Figure 7:
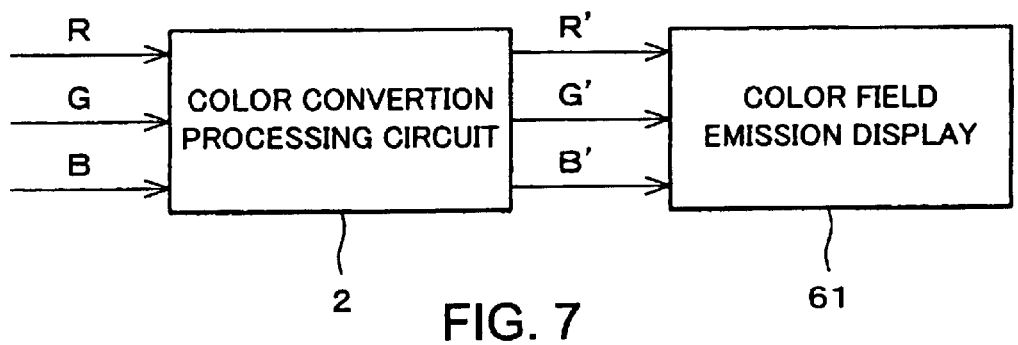
FIG. 7 is a block diagram schematically showing an arrangement of a color display device according to one embodiment of the present invention.

The following will explain another embodiment of the present invention with reference to FIG. 7. As shown in FIG. 7, a color display of the present invention includes:

a color field emission display 61;

a color conversion processing circuit (signal processing means, color conversion processing means) 2 which processes a color image signal made up of a red signal indicating gradation levels of red, a green signal indicating gradation levels of green, a blue signal indicating gradation levels of blue, then outputs the converted color image signal including the red signal, the green signal and the blue signal to the color field emission display 61.

The color conversion processing circuit 2 processes the color signals of R, G and B in the same manner as that of Embodiment 1. Further, the inputted color image signal of the present invention is also the same as that of Embodiment 1.

Accordingly, it is possible to convert an image signal of half tone, having a plurality of color signals at different rates, to a half tone closer to a primary color. Further, since high chroma (intense color) can be maintained while moderating luminance of fluorescence body, it becomes possible to reduce power consumption while maintaining a desirable level of display quality in actual use.

The following will explain the present invention more in detail by referring to examples. Note that, the present invention is not limited by the following examples in any ways.

EXAMPLE 1

The inputted color image signal of the present example is made up of 3 colors (R, G and B) respectively having 256 gradation levels (0(black) to 255(white)). Namely, the inputted image signal is a color digital signal of 24 bits (full color) made up of a red signal R, a green signal G and a blue signal B respectively having 256 gradation levels of 8 bits, which is the same as the case of n=8 (N=256) in the described embodiments.

Figure 8:
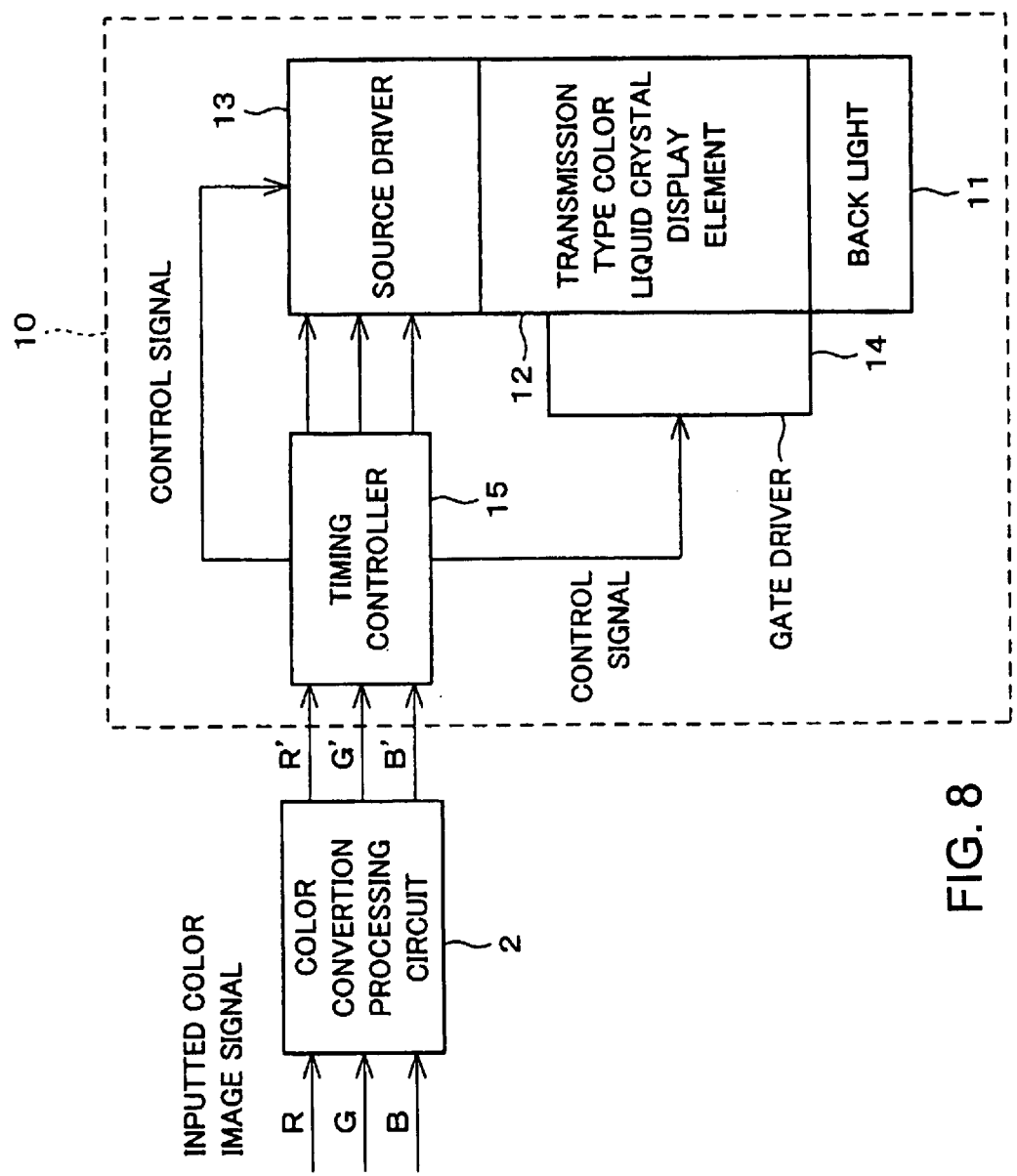
FIG. 8 is a block diagram schematically showing an arrangement of a color display device according to one example of the present invention.

In the present example, as shown in FIG. 8, a transmission type color liquid crystal display 10 of TFT drive is adopted as the shutter type color display 1 of described Embodiment 1. The transmission type color liquid crystal display 10 includes:

a backlight 11 provided as the light source;

a transmission type color liquid crystal display element (a light shutter) 12 which has a liquid crystal layer for controlling light from the backlight 11 and a large number of TFTs for switching the liquid crystal layer;

a source driver 13 which applies display signals to source electrodes of the TFTs;

a gate driver 14 which applies gate voltage (scanning signals) to gate electrodes of the TFTs.

a timing controller 15 which supplies color digital image signals to the source driver 13, and also supplies control signals for controlling the source driver 13 and the gate driver 14 to the source driver 13 and the gate driver 14.

As shown in FIG. 8, the color digital image signal (the red signal R", the green signal G" and the blue signal B") processed by the color conversion processing circuit 2 is inputted to the timing controller 15.

Further, the transmission type color liquid crystal display element 12 has color filters, which are thinner (1.2 µm) than the color filters normally used in the conventional color liquid crystal display device and having transmittance of 5% higher.

In the present example, coefficients Krg, Krb, Kgr, Kgb, Kbr and Kbg are set to 0.125 (=1/2$^3$) considering color reproduction and minimizing the scale of the color conversion processing circuit 2.

Note that, for comparing with the color display device of the present example (the color conversion processing circuit 2 is ON), two types of color display devices are prepared as follows.

1. a color liquid crystal display device having an arrangement (a conventional arrangement) such that the color conversion processing circuit 2 is removed from the color display device of the present example and also, the color filters are changed to the ones having normal thickness (1.3 µm) (hereinafter referred to as a color display device of Comparative example 1).

2. a color liquid crystal display device having an arrangement such that the color conversion processing circuit 2 is OFF, and the inputted color digital image signal is directly inputted to the transmission type color liquid crystal display 10 after passing through the color conversion processing circuit 2 (hereinafter referred to as a color display device of Comparative example 2).

The table 1 shows the result of comparison between the color display device of the present example and the color display devices of Comparative example 1 and Comparative example 2.

TABLE 1

|  | EXAMPLE 1 | COMPARATIVE EXAMPLE 1 | COMPARATIVE EXAMPLE 2 |
|---|---|---|---|
| TRANSMITTANCE (RELATIVE VALUE) | 105% | 100% | 105% |
| COLOR REPRODUCTION RANGE (RELATIVE VALUE) | 94% | 100% | 94% |
| SUBJECTIVE EVALUATION FOR COLOR REPRODUCTION | 4.5 | 4.9 | 3.3 |

The color reproduction range in Table 1 is according to the area of a triangle made up of three chromaticity coordinates points of primary colors (red, green and blue) on a CIE chromaticity coordinate points. Further, subjective evaluation for color reproduction is an average value of results of the following investigation. Ten observers compare some general images (natural images) and the same images displayed in the screens of the present embodiment and Comparative examples 1 and 2, then the observers evaluate the visual difference with respect to the color fading (effectiveness of the signal processing in the examples) with the following evaluation rate.

5. unrecognizable
4. recognizable but not obvious
3. recognizable but does not interferes the display
2. interferes the display
1. greatly interferes the display Note that, "not obvious" is a level that the fading of color is recognizable at a close look, but the observers can watch the display without being aware of the difference. Also, "does not interferes the display" is a level that the fading of color is obvious, but it does not interferes the display.

In Table 1, the color display devices of Example 1 and Comparative example 2 have transmittance of 5% higher than the color display device of Comparative example 1. Thus, when luminance of the backlight is set to the same level in all of those color display devices, the color display devices of Example 1 and Comparative example 2 have bright displays since luminance of the color display devices of Example 1 and Comparative example 2 is 5% higher than that of the color display device of Comparative example 1. Further, when luminance of the devices is set to the same level in all of those color display devices, luminance of the backlight of the color display devices of Example 1 and Comparative example 2 can be reduced to 5% lower (darker) than that of the color display device of Comparative example 1. Accordingly, power consumption can be reduced to about 5% lower in the color display device of Example 1 than the color display device of Comparative example 1.

Further, since those color display devices use color filters for displaying color images, it is necessary to use thick color filters as with the color filters of Comparative example 1 so as to improve color reproduction when the color conversion processing circuit 2 is not provided. However, in this case, transmittance will decrease, and a decrease of lightness (display quality) and an increase of power consumption will occur. However, high color reproduction decreases in the use of thin color filters as with the color filters of Comparative example 2.

In contrast, in Example 1, color reproduction of primary colors is decreased compared to Comparative example 1. However, in Example 1, according to the result of the subjective evaluation, only a few observers recognized the fading of colors. Thus, it is shown that the color display device of Example 1 maintains color reproduction close to the sensing limit (a limit of sensing the difference), and has an excellent result of the subjective evaluation compared to Comparative example 2 which does not process the inputted signal. This is because the decrease of color reproduction is almost unrecognizable in actual use (in subjective evaluation) in Example 1 since the color conversion processing circuit 2 enhances half tones of general natural pictures which mainly have half tones in most cases.

Note that, as it has been stated, it is not possible to widen the color reproduction range of primary colors by controlling signal processing. However, color reproduction of the color display device of Example 1 is visually widened to the observers by enhancing chroma of half tones rather than widening the color reproduction range of the transmission type color liquid crystal display 10.

As described, it becomes possible to improve luminance and reduce power consumption while maintaining a desirable level of display quality in actual use.

EXAMPLE 2

The inputted color image signal of the present example is made up of 3 colors (R, G and B) respectively having 256 gradation levels (0(black) to 255(white)). Namely, the inputted image signal is a color digital signal of 24 bits (full color) made up of a red signal R, a green signal G and a blue signal B respectively having 256 gradation levels of 8 bits, which is the same as the case of n=8 (N=256) in the described embodiments.

Figure 9:
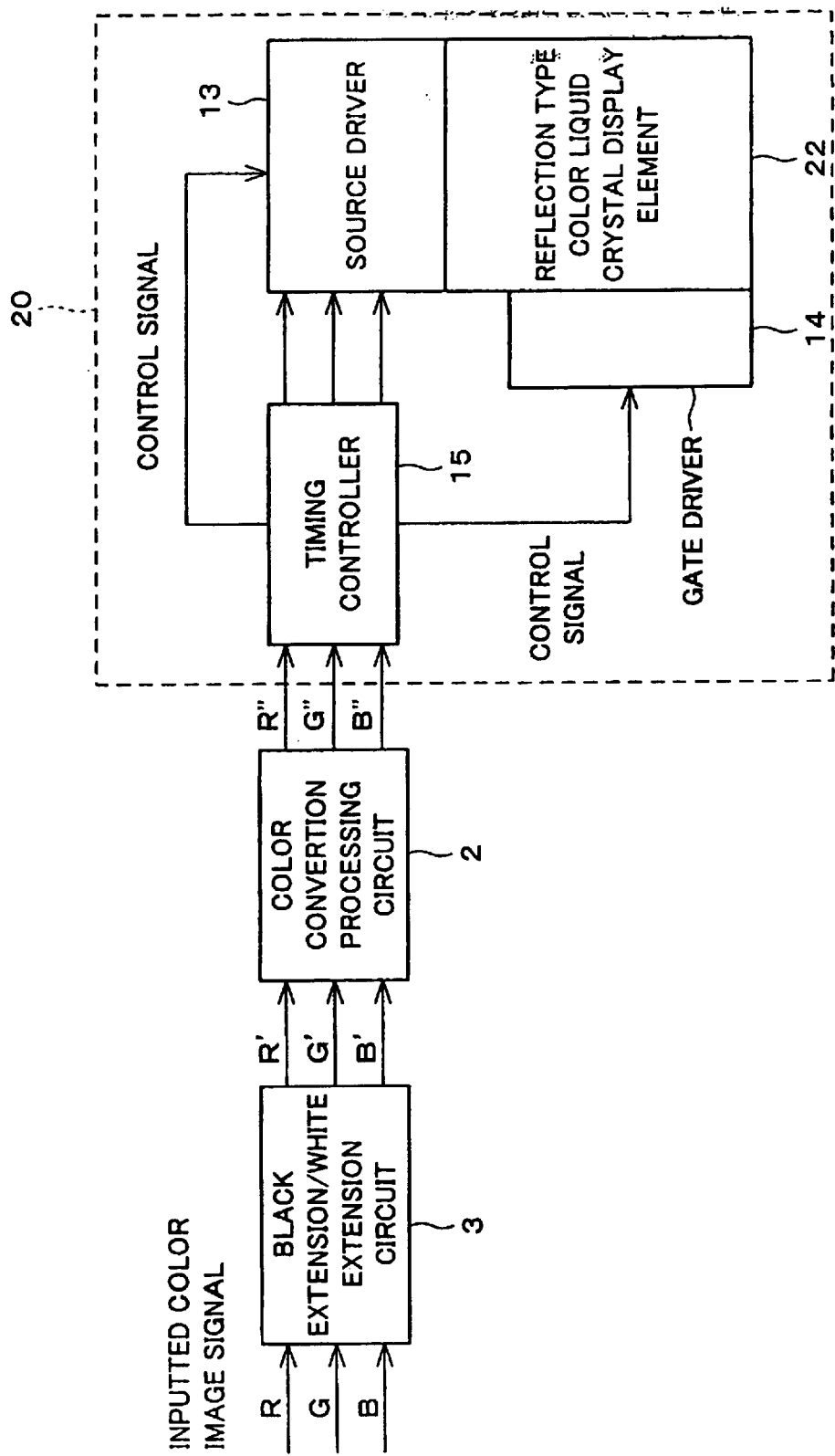
FIG. 9 is a block diagram schematically showing an arrangement of a color display device according to another example of the present invention.

In the present example, as shown in FIG. 9, a conventionally-known reflection type color liquid crystal display 20 of TFT drive is adopted as the shutter type color display 1 of described Embodiment 2. The reflection type color liquid crystal display 20 has the same arrangement as that of the transmission type color liquid crystal display 10 except for a reflection type color liquid crystal element (light shutter) 22 instead of the backlight 11 and the transmission type color liquid crystal element 12. In addition to the liquid crystal layer and the TFTs, the reflection type color liquid crystal element 22 includes a reflection layer on the backside of the liquid crystal layer for reflecting external light (light from external light source, such as the sun or room lighting). The reflected external light by the reflection layer is adjusted by the liquid crystal for displaying an image.

As shown in FIG. 9, in the reflection type color liquid crystal display 20, the color digital image signal (the red signal R", the green signal G" and the blue signal B") processed by the black extension and white extension circuit 3 is inputted to the timing controller 15.

In the black extension and white extension circuit 3 of the present example, the relation between t (the gradation values of color signals R, G and B), and t' (the gradation values of color signals R', G' and B') are denoted as follows.

when $0 \leq t \leq 16$, t'=0 when $17 \leq t \leq 234$, $t'=255 \times (t-16)/(235-16)$ (Note; a calculation result should be rounded down by the decimal point) and;

when $235 \leq t \leq 255$, t'=255

In the present example, the coefficients Krg, Krb, Kgr, Kgb, Kbr and Kbg are set as follows considering color reproduction and minimizing the scale of the color conversion processing circuit 2.

$Krg=Krb=0.25(=1/2^2)$ $Kgr=Kgb=0.5(=1/2)$ $Kbr=Kbg=0.25(=1/2^2)$

The described reflection type color liquid crystal display 20 including the black extension and white extension circuit 3 and the color conversion processing circuit 2 is capable of enhancing half tones, and image quality is improved compared to a conventional reflection type liquid crystal display device.

EXAMPLE 3

The inputted color image signal of the present example is made up of 3 colors (R, G and B) respectively having 256 gradation levels (0 (black) to 255 (white)) as with Examples 1 and 2.

Figure 10:
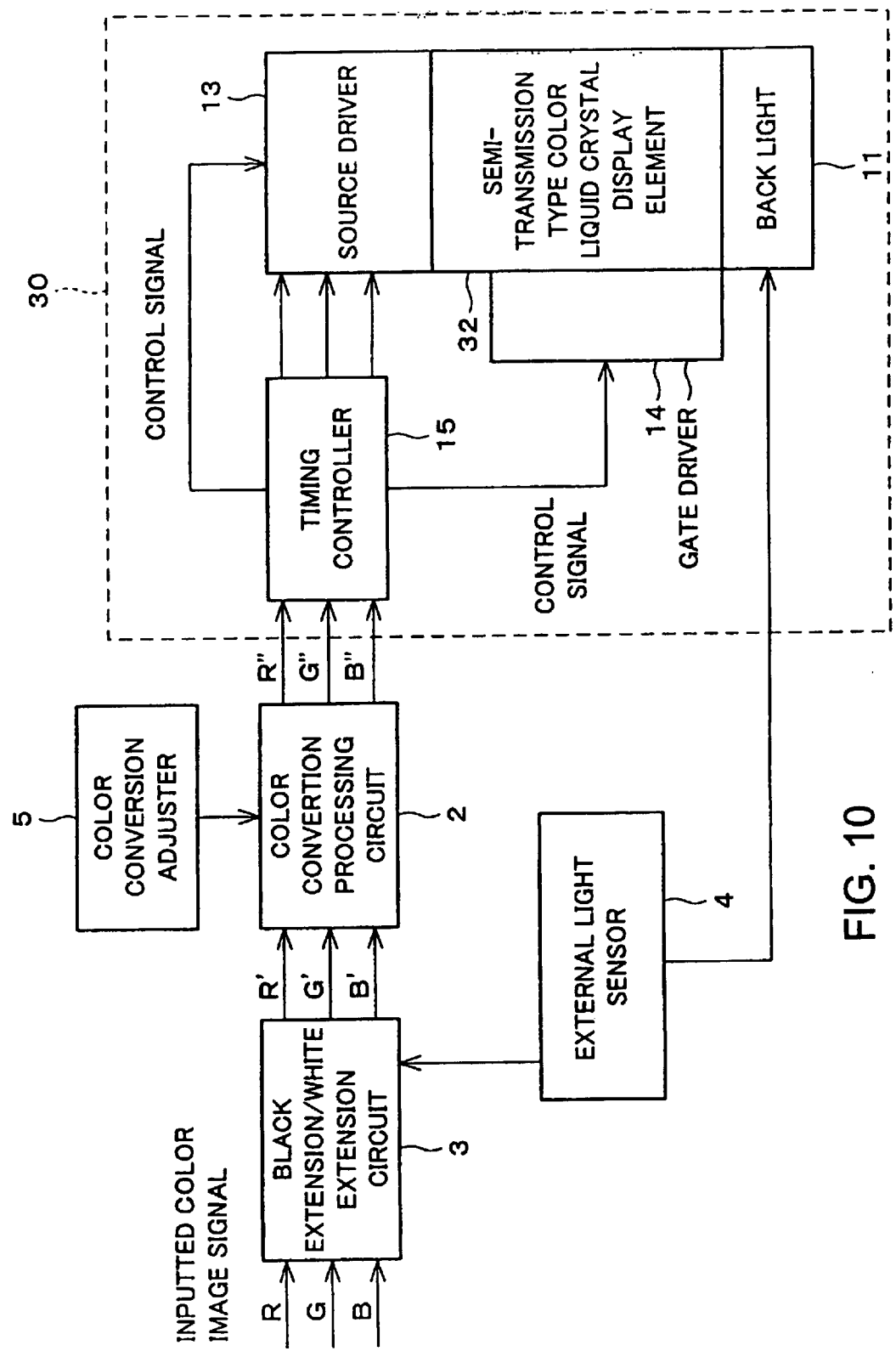
FIG. 10 is a block diagram schematically showing an arrangement of a color display device according to another example of the present invention.

In the present example, as shown in FIG. 10, a conventionally-known semi-transmission type color liquid crystal display 30 of TFT drive is adopted as the shutter type color display 1 of described Embodiment 3. The semi-transmission type color liquid crystal display 30 has the same arrangement as that of the transmission type color liquid crystal display 10 except for a semi-reflection type color liquid crystal element (light shutter) 32 instead of the transmission type color liquid crystal element 12. In addition to the liquid crystal layer and the TFTs, the semi-transmission type color liquid crystal element 32 includes a semi-transmission reflector on the backside of the liquid crystal layer for reflecting external light (light from external light source, such as the sun or room lighting) and transmitting light from the backlight 11.

Further, according to the brightness of external light sensed by the external light sensor 4, the semi-transmission type color liquid crystal display 30 uses external light for displaying an image without lighting the backlight 11, when the brightness of external light is at or greater than 4000 lux. On the other hand, the semi-transmission type color liquid crystal display 30 lights the backlight 11 for displaying an image, when the brightness of external light is smaller than 4000 lux.

As shown in FIG. 10, in the semi-transmission type color liquid crystal display 30, the color digital image signal (the red signal R", the green signal G" and the blue signal B") processed by the black extension and white extension circuit 3 is inputted to the timing controller 15.

In the black extension and white extension circuit 3 of the present example, Z is set to 1. In the black extension and white extension circuit 3 of the present example, x and y are controlled under the following condition.

x=40, y=220, when the brightness of external light is at or greater than 4000 lux (high), and the backlight 11 is OFF; and x=25, y=230, when the brightness of external light is at or greater than 2000 lux but smaller than 4000 lux (middle), and the backlight 11 is ON; and x=10, y=240, when the brightness of external light is smaller than 2000 lux (low), and the backlight 11 is ON.

Note that, when the brightness of external light is at or greater than 4000 lux, namely, the brightness of external light is high, the reflection mode is dominant. Further, when the brightness of external light is at or greater than 2000 lux but smaller than 4000 lux, namely, the brightness of external light is relatively low, the reflection mode and the transmission mode can coexist. Further, when the brightness of external light is smaller than 2000 lux, namely, the brightness of external light is low, the transmission mode is dominant.

In the present example, the coefficients k, Crg', Crb', Cgr', Cgb', Cbr', Cbg', f0, g0 and h0 are set as follows considering color reproduction and minimizing the scale of the color conversion processing circuit 2.

k=1

Crg'=Crb'=Cgr'=Cgb'=Cbr'=Cbg'=0.25 f0=g0=h0=2

The described semi-transmission type color liquid crystal display 30 including the black extension and white extension circuit 3 and the color conversion processing circuit 2 is capable of optimally enhancing half tones under different conditions when contrast of the display varies depending on the brightness of the external light and the balance of the reflection mode and the transmission mode. Therefore, image quality is improved compared to a conventional semi-transmission type liquid crystal display device.

Figure 11:
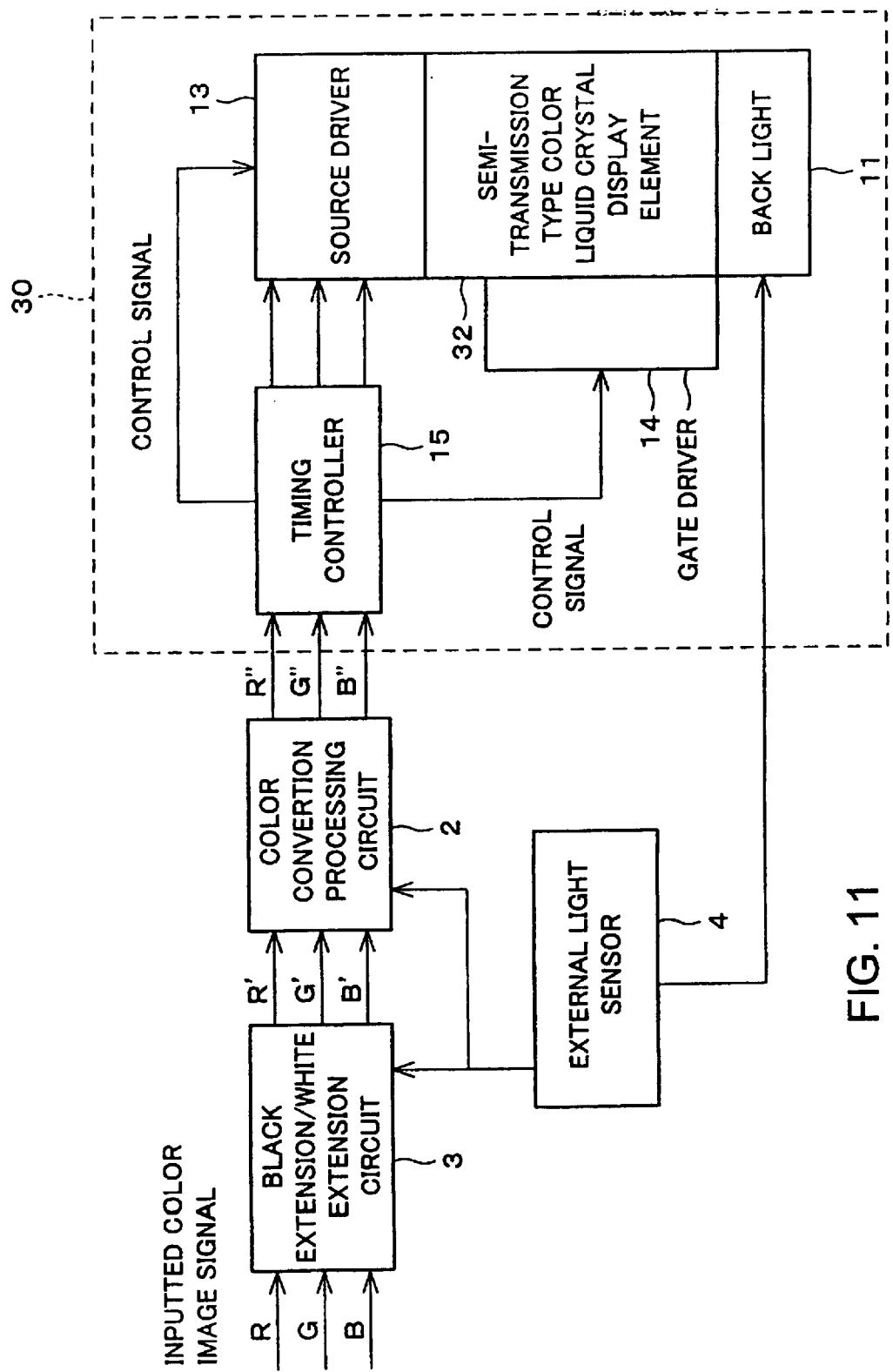
FIG. 11 is a block diagram schematically showing an arrangement of a color display device according to another example of the present invention.

Further, in the present example, a user can adjust the value of β to a desirable value by the color conversion adjuster 5; however, as shown in FIG. 11, the value of β may be automatically controlled in the range of from 0 to 1, inclusive, depending on the sensed result of the external light sensor 4, instead of providing the color conversion adjuster 5.

Further, z is set to 1 in the black extension and white extension circuit 3; however, the value of z can suitably be varied since contrast (each color) of the display will be enhanced as the value of z increases. For example, when the transmission type color liquid crystal display 10 is adopted instead of the semi-transmission type color liquid crystal display 30 under relatively light condition, visible image quality increased by setting the value of Z to be greater than 1. Further, for example, when the transmission type color liquid crystal display 10 is used under lighter condition, visible image quality increased by setting the value of Z to 1.2. This effect was also found when setting x to be more than 16, or setting y to be less than 235.

EXAMPLE 4

A color display device of the present example is identical with the color display device of Example 1 except for the coefficients Krg, Krb, Kgr, Kgb, Kbr and Kbg of the calculation operation by the color conversion processing circuit 2.

In the present example, the coefficients Krg, Krb, Kgr, Kgb, Kbr and Kbg are set to 0.25 (=$1/2^2$) considering color reproduction and minimizing the scale of the color conversion processing circuit 2.

Figure 12:
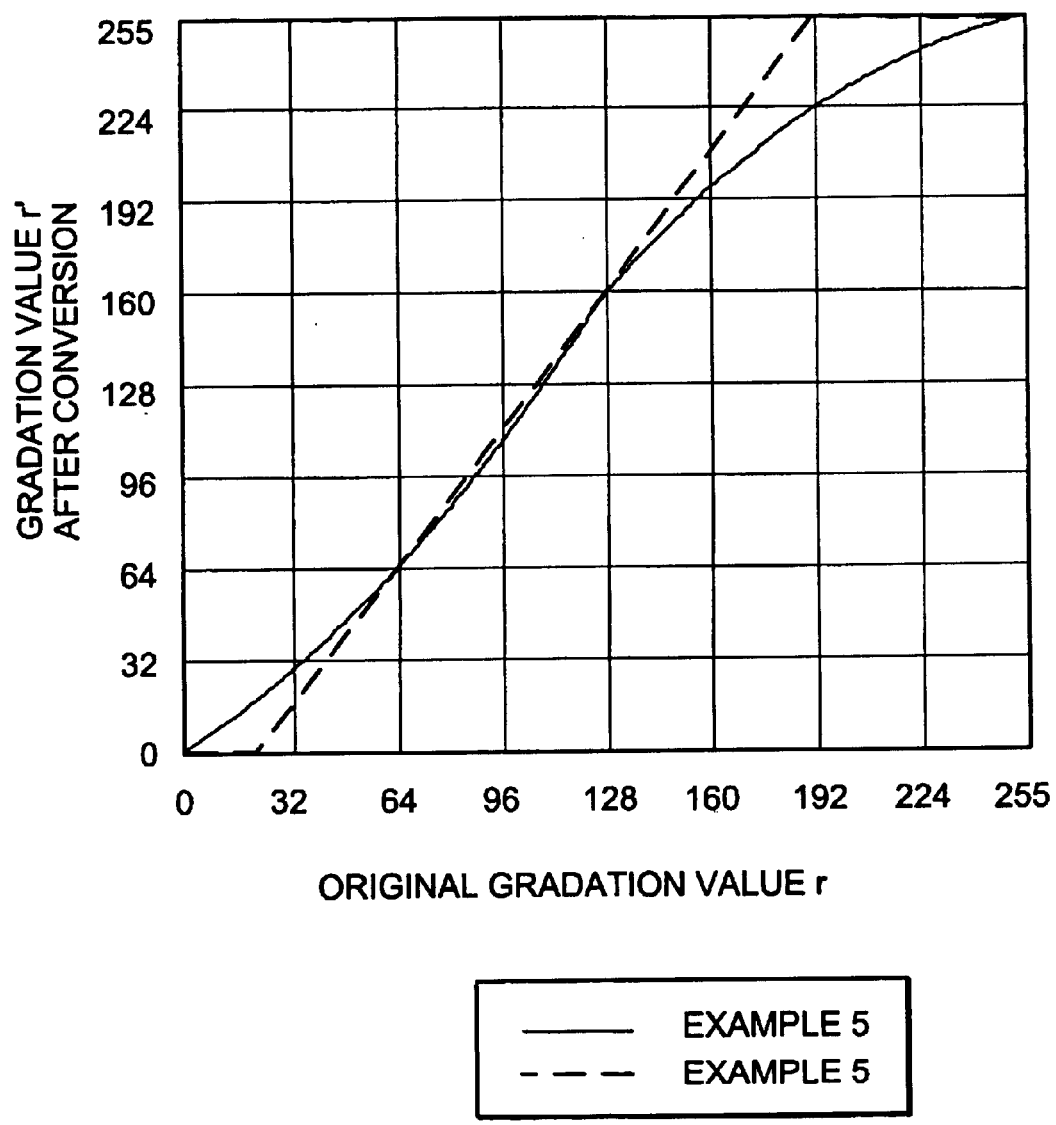
FIG. 12 is a graph showing gradation values of a red signal before and after color conversion, in a color display device according to another example of the present invention.

In FIG. 12, the broken line indicates the change of the gradation value r' of the red signal R' of the inputted color image signal, when the value r' is varied in the range of 0 (black) to 255 (white) while the gradation value g' of the green signal G' and b' of the blue signal B' are fixed to 64.

EXAMPLE 5

A color display device of the present invention has the same arrangement of that of Example 1 except for the color conversion processing circuit 2 which is the one used in Embodiment 5.

Accordingly, the gradation value r' of the red signal R', the gradation value g' of the green signal G' and the gradation value b' of the blue signal B' of the inputted color image signal are denoted by the following equations.

$$r'=r+Krg(r-g)+Krb(r-b)$$

$$g'=g+Kgr(g-r)+Kgb(g-b)$$

$$b'=b+Kbr(b-r)+Kbg(b-g)$$

The inputted color image signal is made up of a red signal R, a green signal G and a blue signal B respectively having 256 gradation levels of 8 bits, which is the same as the case of n=8 (N=256) in Example 1. Further, in the present embodiment, the coefficient C is set to 0.25 considering color reproduction and minimizing the scale of the color conversion processing circuit 2.

Accordingly, the coefficients Krg, Krb, Kgr, Kgb, Kbr and Kbg are denoted by the following equations.

$$Krg=0.25\times\alpha r\times\alpha g$$

$$Krb=0.25\times\alpha r\times\alpha b$$

$$Kgr=0.25\times\alpha g\times\alpha r$$

$$Kgb=0.25\times\alpha g\times\alpha b$$

$$Kbr=0.25\times\alpha b\times\alpha r$$

$$Kbg=0.25\times\alpha b\times\alpha g$$

Further, $\alpha r$, $\alpha g$ and $\alpha b$ are denoted by the following equations.

$$\alpha r = 2\times r/255 \quad (r<128)$$
$$\phantom{\alpha r}= 2\times(1-r)/255 \quad (r\geq 128)$$
$$\alpha g = 2\times g/255 \quad (g<128)$$
$$\phantom{\alpha g}= 2\times(1-g)/255 \quad (g\geq 128)$$
$$\alpha b = 2\times b/255 \quad (b<128)$$
$$\phantom{\alpha b}= 2\times(1-b)/255 \quad (b\geq 128)$$

In FIG. 12, the solid line indicates the change of the gradation value r' of the red signal R' of the inputted color image signal, when the value r is varied in the range of 0 (black) to 255 (white) while the gradation value g of the green signal G and b of the blue signal B are fixed to 64.

As shown in FIG. 12, in Example 4, as the gradation value comes closer to white (255) or black (0), the value after conversion become saturated with the value (255 or 0). Namely, when the original gradation value comes closer to white (255) or black (0), the gradation value after conversion becomes constant at 255 (white) or 0 (black). Thus, the number of actual gradation levels decreases.

On the other hand, the solid line indicating the gradation value of Example 5 is drawing a smooth curve, and there is no saturation. Accordingly, the number of actual gradation levels will not decrease, and image expression quality will increase.

Further, the subjective evaluation for the color reproduction described in Example 1 was performed with respect to the color display device of Example 5, and the result of the evaluation was 4.8. Accordingly, the color display device of Example 5 has substantially the same display quality as that of Comparative example 1.

Note that, a liquid crystal display was used respectively in Examples 1 through 4 as a shutter type color display 1, however, an electro-chromic display may also be used as the shutter type color display 1.

As described, a color display device of the present invention includes:

one of (1) a shutter type color display, (2) a color display having a reflective member or a diffuse transmission member provided on a display screen or in the vicinity of the display screen, (3) a color plasma display or (4) a color field emission display;

signal processing means for processing a color image signal, made up of plural color signals respectively indicating each gradation level of the plural colors, and outputting the processed color image signal to the shutter type color display. Further, the signal processing means includes a color conversion processing means for increasing the gradation level of the color signals having the highest gradation level while decreasing the gradation levels of color signal having the lowest gradation level when the gradation levels of the plural colors are not equal.

In the foregoing color display device, the color image signal is made up of a red signal (a signal indicating the gradation level of red), a green signal (a signal indicating the gradation level of green) and a blue signal (a signal indicating the gradation level of blue). It is preferable that the color conversion processing means converts the levels R, G and B of the inputted color signal to an outputted image signal made up of the gradation levels of R', G' and B' which are the gradation values calculated by the following equations.

$$R' = R + Krg(R-G) + Krb(R-B)$$

$$G' = G + Kgr(G-R) + Kgb(G-B)$$

$$B' = B + Kbr(B-R) + Kbg(B-G)$$

(Note; Krg, Krb, Kgr, Kgb, Kbr and Kbg are positive constants, or variables of not less than 0)

Incidentally, in the signal processing of the previously described Japanese Unexamined Patent Publication No. 10-240198/1998 (Tokukaihei 10-240198 published on Sep. 11, 1998), a fixed value or values are added for changing the one or two of the gradation levels. However, it is necessary to precisely adjust the respective gradation levels of each color to optimal values in order to realize a desirable image quality.

In the foregoing structure, it is preferable that chroma increases (color is more enhanced) as the difference between the gradation levels for each color becomes greater. Accordingly, chroma more increases when the color becomes closer to a primary color, and less increases when the color becomes closer to an achromatic color. Consequently, it is possible to increase chroma without decreasing color reproduction, and realize a desirable image quality.

Further, the color conversion processing means can be realized with a simple structure circuit, without using a big-scale circuit such as an image memory.

In the foregoing arrangement, it is preferable that Krg, Krb, Kgr, Kgb, Kbr and Kbg are not more than 2, and further preferably, not more than 0.5.

Furthermore, if assuming that Krg, Krb, Kgr, Kgb, Kbr and Kbg are positive constants, it is possible to simplify the calculation operation by the color conversion processing means, thereby realizing the color conversion processing means with a smaller-scale circuit.

When the red signal, the green signal and the blue signal are digital signals having N gradation values of n bit ($N=2^n$), the digital signals have one of N gradation values (0, 1, 2, . . . N−2, N−1, etc.), and therefore the gradation levels R, G and B are denoted by 0 (black), 1/(N−1), 2/(N−1), . . . (N−2)/(N−1), 1 (white).

Accordingly, when r, g, b express the values of the red signal, the green signal and the blue signal, the gradation levels, R, G and B are denoted by the following equations.

$$R = r/(N-1)$$

$$G = g/(N-1)$$

$$B = b/(N-1)$$

Further, minus values are not applicable for the gradation levels R', G' and B', therefore, when the right hand sides of the foregoing equations are minus, the left hand sides of the equations will be 0.

Further, when Krg, Krb, Kgr, Kgb, Kbr and Kbg are constants, it is further preferable that they are constants denoted by $1/2^n$ (n is an integer). In this manner, it is possible to simplify the calculation operation by the color conversion processing means, and the color conversion processing means can be realized with a smaller-scale circuit. This is because the color image signal is a digital signal of a binary number, and the calculation which multiplies the digital signal by $1/2^n$ (n is an integer) is easily performed by a shift.

The color conversion processing means may respectively vary Krg, Krb, Kgr, Kgb, Kbr and Kbg according to at least one of R, G and B, so as to more suitably improve chroma (enhance colors).

Further, the color conversion processing means may respectively vary Krg and Krb according to R, vary Kgr and Kgb according to G, vary Kbr and Kbg according to B, so as to more suitably improve chroma (enhance colors).

Further, in the foregoing arrangement, it is preferable that the color conversion processing means vary Krg and Krb to be maximum when R is a gradation level of a half tone, and vary Krg and Krb to be minimum when R is a gradation level of white or black, also, vary Kgr and Kgb to be maximum when G is a gradation level of a half tone, and vary Kgr and Kgb to be minimum when G is a gradation level of white or black, and further, vary Kbr and Kbg to be maximum when B is a gradation level of a half tone, and vary Kbr and Kbg to be minimum when B is a gradation level of white or black.

With the foregoing arrangement, it is possible to prevent chroma from being excessively increased (prevent colors from being excessively enhanced) due to the signal processing of the color conversion processing means. Namely, it is possible to prevent the gradation levels of each color of a color image signal from being converted to the gradation levels of white or black, i.e., color saturation due to the signal processing of the color conversion processing means.

With the foregoing arrangement, Krg, Krb, Kgr, Kgb, Kbr and Kbg are denoted by the following equations.

$$Krg = \alpha r \cdot Lrg$$

$$Krb = \alpha r \cdot Lrb$$

$$Kgr = \alpha g \cdot Lgr$$

$$Kgb = \alpha g \cdot Lgb$$

$$Kbr = \alpha b \cdot Lbr$$

$$Kbg = \alpha b \cdot Lbg$$

(Note;

Lrg and Lrb are positive constants, or variables of not less than 0 which vary within a range regardless of R Lgr and Lgb are positive constants, or variables of not less than 0 which vary within a range regardless of G Lbr and Lbg are positive constants, or variables of not less than 0 which vary within a range regardless of B)

Further, it is preferable that $\alpha r$ is a function of not less than 0 which varies according to R, and $\alpha g$ is a function of not less than 0 which varies according to G, and $\alpha b$ is a function of not less than 0 which varies according to B.

Further, in the foregoing arrangement, assuming the gradation level of white (maximum gradation level) is 1, and when the following equations are satisfied, $$\alpha r = f(R)$$

$$\alpha g = g(G)$$

$$\alpha b = h(B)$$

it is preferable that the following equations are satisfied.

$$f(0) = f(1) = 0$$

$$g(0) = g(1) = 0$$

$$h(0) = h(1) = 0$$

Further, it is preferable that the f (R), g (G) and h (B) are functions increase from 0 to T (Note; T is a constant such that o<T<1) and decrease from T to 1. Further, it is preferable that the T is about 0.5.

It is preferable that f (R), g (G) and h (B) are functions denoted by the following equations.

$$f(R) = f0 \cdot R^k \quad (R < 0.5)$$
$$= f0(1-R)^k \quad (R \geq 0.5)$$
$$g(G) = g0 \cdot G^k \quad (G < 0.5)$$
$$= g0(1-G)^k \quad (G \geq 0.5)$$
$$h(B) = h0 \cdot B^k \quad (B < 0.5)$$
$$= h0(1-B)^k \quad (B \geq 0.5)$$

(Note; the f0, g0, h0 and k are positive constants)

Namely, it is preferable that Krg, Krb, Kgr, Kgb, Kbr and Kbg are variables denoted by the following equations.

$$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

(Note;

Lrg and Lrb are positive constants, or variables of not less than 0 which vary within a range regardless of R
Lgr and Lgb are positive constants, or variables of not less than 0 which vary within a range regardless of G
Lbr and Lbg are positive constants, or variables of not less than 0 which vary within a range regardless of B)

Also, it is preferable that αr, αg and αb are variables denoted by the following equations.

$$\alpha r = f0 \cdot R^k \quad (R < 0.5)$$
$$= f0(1-R)^k \quad (R \geq 0.5)$$
$$\alpha g = g0 \cdot G^k \quad (G < 0.5)$$
$$= g0(1-G)^k \quad (G \geq 0.5)$$
$$\alpha b = h0 \cdot B^k \quad (B < 0.5)$$
$$= h0(1-B)^k \quad (B \geq 0.5)$$

(Note; the f0, g0, h0 and k are positive constants)

With the foregoing arrangement, it is possible to prevent the gradation levels of half tone with respect to each color of the color image signal from being converted to the gradation levels of white or black due to the signal processing of the color conversion processing means. Thus, the gradation levels of half tone can be maintained, and the number of actual gradation values will not decrease, thereby improving color reproduction.

Further, Krg, Krb, Kgr, Kgb, Kbr and Kbg are variables denoted by the following equations.

$$Krg = C \cdot \alpha r \cdot \alpha g$$
$$Krb = C \cdot \alpha r \cdot \alpha b$$
$$Kgr = C \cdot \alpha g \cdot \alpha r$$
$$Kgb = C \cdot \alpha g \cdot \alpha b$$
$$Kbr = C \cdot \alpha b \cdot \alpha r$$
$$Kbg = C \cdot \alpha b \cdot \alpha g$$

(Note; C is a positive constant)

Also, it is preferable that αr, αg and αb are variables denoted by the following equations.

$$\alpha r = 2 \times R \quad (R < 0.5)$$
$$\alpha r = 2 \times (1-R) \quad (R \geq 0.5)$$
$$\alpha g = 2 \times G \quad (G < 0.5)$$
$$\alpha g = 2 \times (1-G) \quad (G \geq 0.5)$$
$$\alpha b = 2 \times B \quad (B < 0.5)$$
$$\alpha b = 2 \times (1-B) \quad (B \geq 0.5)$$

By thus setting the parameters, for example, Krg becomes the minimum value 0 when one of the R or G is 0 or 1, and becomes maximum value 1 when R and G are both 0.5. This makes it possible to prevent the gradation levels of half tone with respect to each color of the color image signal from being converted to the gradation levels of white or black due to the signal processing of the color conversion processing means. Thus, the gradation levels of half tone can be maintained, and the number of actual gradation values will not decrease, thereby improving color reproduction.

The f (R), g (G) and h (B) may be functions denoted by the following equations.

$$f(R) = f0 \cdot \sin^2(\pi \cdot R^k)$$
$$g(G) = g0 \cdot \sin^2(\pi \cdot G^k)$$
$$h(B) = h0 \cdot \sin^2(\pi \cdot B^k)$$

(Note; the f0, g0, h0 and k are positive constants)

Further, in the foregoing arrangement, assuming the gradation level of white (maximum gradation level) is 1, and when the following equations are satisfied, $$\alpha r = f(R)$$
$$\alpha g = g(G)$$
$$\alpha b = h(B)$$

the following equations may be satisfied.

$$f(0) = 0$$
$$f(1) > 0$$
$$g(0) = 0$$
$$g(1) > 0$$
$$h(0) = 0$$
$$h(1) > 0$$

Further, it is preferable that the f (R), g (G) and h (B) may be functions which increase.

With the foregoing arrangement, visual color becomes greatly enhanced, and it will be an advantage in the case of observing a display having poor color purity in a considerably light place (in external environment), for example, in the case of observing an existing organic electroluminescence display, which has poor color purity, under strong sunlight.

The f (R), g (G) and h (B) may be functions denoted by the following equations.

$$f(R) = f0 \cdot R^k$$

$$g(G) = g0 \cdot G^k$$

$$h(B) = h0 \cdot B^k$$

(Note; the f0, g0, h0 and k are positive constants)

With a calculation using these functions, it becomes possible to realize the foregoing arrangement for greatly enhancing visual color.

The f (R), g (G) and h (B) may be functions denoted by the following equations.

$$f(R) = f0 \cdot \sin^2\{(\pi/2) \cdot R^k\}$$

$$g(G) = g0 \cdot \sin^2\{(\pi/2) \cdot G^k\}$$

$$h(B) = h0 \cdot \sin^2\{(\pi/2) \cdot B^k\}$$

(Note; the f0, g0, h0 and k are positive constants)

With a calculation using these functions, it becomes possible to realize the foregoing arrangement for greatly enhancing visual color.

Note that, it is preferable that the $\alpha r$, $\alpha g$ and $\alpha b$ are not more than 1. Further, it is preferable that the f0, g0 and h0 are also not more than 1. Also, it is preferable that Lrg, Lrb, Lgr, Lgb, Lbr and Lbg are not more than 2, and further preferably not more than 0.5.

In these color display devices having the described arrangements, it is preferable that the color conversion processing means may respectively vary Krg and Kbg according to G, vary Krb and Kgb according to B, vary Kgr and Kbr according to R so as to more suitably improve chroma (enhance colors).

The foregoing shutter type color display is preferably includes color filters of not thicker than 1.2 μm for displaying a color image. With this arrangement, brightness of the display increases and power consumption of the backlight can be reduced.

Further, in the foregoing arrangement, it is preferable that the color conversion processing means vary Krg and Kbg to be maximum when G is a gradation level of a half tone, and vary Krg and Kbg to be minimum when G is a gradation level of white or black, also, vary Krb and Kgb to be maximum when B is a gradation level of a half tone, and vary Krb and Kgb to be minimum when B is a gradation level of white or black, and further, vary Kgr and Kbr to be maximum when the R is a gradation level of a half tone, and vary Kgr and Kbr to be minimum when the R is a gradation level of white or black.

With the foregoing arrangement, it is possible to prevent chroma from being excessively increased (prevent colors from being excessively enhanced) due to the signal processing of the color conversion processing means. Namely, it is possible to prevent the gradation levels of each color of a color image signal from being converted to the gradation levels of white or black, i.e., color saturation due to the signal processing of the color conversion processing means.

With the foregoing arrangement, Krg, Krb, Kgr, Kgb, Kbr and Kbg are denoted by the following equations.

$$Krg = \gamma r \cdot Crg$$

$$Krb = \gamma r \cdot Crb$$

$$Kgr = \gamma g \cdot Cgr$$

$$Kgb = \gamma g \cdot Cgb$$

$$Kbr = \gamma b \cdot Cbr$$

$$Kbg = \gamma b \cdot Cbg$$

(Note;

$\gamma r$ is a positive constant, or a variable of not less than 0 which varies according to R $\gamma g$ is a positive constant, or a variable of not less than 0 which varies according to G $\gamma b$ is a positive constant, or a variable of not less than 0 which varies according to B)

Further, it is preferable that Crg and Cbg are variables of not less than 0 which vary according to G, and Crb and Cgb are variables of not less than 0 which vary according to B and Cgr and Cbr are variables of not less than 0 which vary according to R.

Further, in the foregoing arrangement, assuming the gradation level of white (maximum gradation level) is 1, and when the following equations are satisfied, $$Crg = i(G)$$

$$Crb = j(B)$$

$$Cgr = k(R)$$

$$Cgb = l(B)$$

$$Cbr = m(R)$$

$$Cbg = n(G)$$

it is preferable that the following equations are satisfied.

$$i(0) = i(1) = 0$$

$$j(0) = j(1) = 0$$

$$k(0) = k(1) = 0$$

$$l(0) = l(1) = 0$$

$$m(0) = m(1) = 0$$

$$n(0) = n(1) = 0$$

Further, it is preferable that the i (G), j (B), k (R), l (B), m (R) and n (G) are functions increase from 0 to T (Note; T is a constant such that 0<T<1) and decrease from T to 1. Further, it is preferable that the T is about 0.5.

It is preferable that i (G), j (B), k (R), l (B), m (R) and n (G) are functions denoted by the following equations.

$$i(G) = Crg' \cdot G^k \quad (G < 0.5)$$
$$= Crg'(1-G)^k \quad (G \geq 0.5)$$

$$j(B) = Crb' \cdot B^k \quad (B < 0.5)$$
$$= Crb'(1-B)^k \quad (B \geq 0.5)$$

$$k(R) = Cgr' \cdot R^k \quad (R < 0.5)$$
$$= Cgr'(1-R)^k \quad (R \geq 0.5)$$

$$l(B) = Cgb' \cdot B^k \quad (B < 0.5)$$

$$= Cgb'(1-B)^k \quad (B \geq 0.5)$$

$$m(R) = Cbr' \cdot R^k \quad (R < 0.5)$$

$$= Cbr'(1-R)^k \quad (R \geq 0.5)$$

$$n(G) = Cbg' \cdot G^k \quad (G < 0.5)$$

$$= Cbg'(1-G)^k \quad (G \geq 0.5)$$

(Note; the k, Crg', Crb', Cgr', Cgb', Cbr' and Cbg' are positive constants)

Further, i (G), j (B), k (R), l (B), m (R) and n (G) may be functions denoted by the following equations.

$$i(G) = Crg' \cdot \text{Sin}^2(\pi \cdot G^k)$$

$$j(B) = Crb' \cdot \text{Sin}^2(\pi \cdot B^k)$$

$$k(R) = Cgr' \cdot \text{Sin}^2(\pi \cdot R^k)$$

$$l(B) = Cgb' \cdot \text{Sin}^2(\pi \cdot B^k)$$

$$m(R) = Cbr' \cdot \text{Sin}^2(\pi \cdot R^k)$$

$$n(G) = Cbg' \cdot \text{Sin}^2(\pi \cdot G^k)$$

(Note; the k, Crg', Crb', Cgr', Cgb', Cbr' and Cbg' are positive constants)

Further, in the foregoing arrangement, assuming the gradation level of white (maximum gradation level) is 1, and when the following equations are satisfied, $$Crg = i(G)$$

$$Crb = j(B)$$

$$Cgr = k(R)$$

$$Cgb = l(B)$$

$$Cbr = m(R)$$

$$Cbg = n(G)$$

the following equations may be satisfied.

$$i(0) = 0$$
$$i(1) > 0$$
$$j(0) = 0$$
$$j(1) > 0$$
$$k(0) = 0$$
$$k(1) > 0$$
$$l(0) = 0$$
$$l(1) > 0$$
$$m(0) = 0$$
$$m(1) > 0$$
$$n(0) = 0$$
$$n(1) > 0$$

Further, it is preferable that the i (G), j (B), k (R), l (B), m (R) and n (G) are functions increase.

With the foregoing arrangement, visual color becomes greatly enhanced, and it will be an advantage in the case of observing a display having poor color purity in a considerably light place (in external environment), for example, in the case of observing an existing organic electroluminescence display, which has poor color purity, under strong sunlight.

The i (G), j (B), k (R), l (B), m (R) and n (G) may be functions denoted by the following equations.

$$i(G) = Crg' \cdot G^k$$

$$j(B) = Crb' \cdot B^k$$

$$k(R) = Cgr' \cdot R^k$$

$$l(B) = Cgb' \cdot B^k$$

$$m(R) = Cbr' \cdot R^k$$

$$n(G) = Cbg' \cdot G^k$$

(Note; the k, Crg', Crb', Cgr', Cgb', Cbr' and Cbg' are positive constants)

With a calculation using these functions, it becomes possible to realize the foregoing arrangement for greatly enhancing visual color.

The i (G), j (B), k (R), l (B), m (R) and n (G) may be functions denoted by the following equations.

$$i(G) = Crg' \cdot \text{Sin}^2\{(\pi/2) \cdot G^k\}$$

$$j(B) = Crb' \cdot \text{Sin}^2\{(\pi/2) \cdot B^k\}$$

$$k(R) = Cgr' \cdot \text{Sin}^2\{(\pi/2) \cdot R^k\}$$

$$l(B) = Cgb' \cdot \text{Sin}^2\{(\pi/2) \cdot B^k\}$$

$$m(R) = Cbr' \cdot \text{Sin}^2\{(\pi/2) \cdot R^k\}$$

$$n(G) = Cbg' \cdot \text{Sin}^2\{(\pi/2) \cdot G^k\}$$

(Note; k, Crg', Crb', Cgr', Cgb', Cbr' and Cbg' are positive constants)

With a calculation using these functions, it becomes possible to realize the foregoing arrangement for greatly enhancing visual color.

Note that, it is preferable that the γr, γg and γb are not more than 1. Further, it is preferable that Crg, Crb, Cgr, Cgb, Cbr and Cbg are not more than 2, and further preferably not more than 0.5. Also, it is preferable that Crg', Crb', Cgr', Cgb', Cbr' and Cbg' are not more than 2, and further preferably not more than 0.5.

The color display devices with the described arrangements may further include adjustment means respectively, for adjusting Krg, Krb, Kgr, Kgb, Kbr and Kbg in the range of value of not less than 0.

This arrangement allows a user to preferably adjust the level of chroma (color).

In the foregoing arrangement, Krg, Krb, Kgr, Kgb, Kbr and Kbg may be denoted by the following equations, and the adjustment means may adjust the β.

$$Krg = \beta \cdot Mrg$$

$$Krb = \beta \cdot Mrb$$

$$Kgr = \beta \cdot Mgr$$

$$Kgb = \beta \cdot Mgb$$

$$Kbr = \beta \cdot Mbr$$

$$Kbg = \beta \cdot Mbg$$

(Note; Mrg, Mrb, Mgr, Mgb, Mbr and Mbg are positive constants, or variables of not less than 0 which respectively vary according to at least one of R, G or B)

It is preferable that the Mrg, Mrb, Mgr, Mgb, Mbr and Mbg are not more than 2, and further preferably not more than 0.5. Further, it is preferable that the β is not less than 0 but not more than 1.

The color display devices with the described arrangements may further include sensing means, respectively, such as a light sensor, for sensing brightness of external light, and the color conversion processing means may control Krg, Krb, Kgr, Kgb, Kbr and Kbg according to the result sensed by the sensing means.

In some cases, the level of reflection on the surface of a color display changes due to a change of external environment, and it also changes the actual contrast of the display. For example, contrast and chroma decrease as the brightness of external light increases. In this case, it is more effective that Krg, Krb, Kgr, Kgb, Kbr and Kbg are controlled according to the change of external environment as with the foregoing arrangement. For example, by increasing Krg, Krb, Kgr, Kgb, Kbr and Kbg as the brightness of external light increases, chroma will not decrease even when having strong external light, and since it also prevents chroma from being excessively increased, color saturation will not occur. Thus, a desirable image quality is ensured.

In the foregoing arrangement, the color conversion processing means may control the β in the range of value of not less than 0 when Krg, Krb, Kgr, Kgb, Kbr and Kbg are denoted by the following equations.

$$Krg = \beta \cdot Mrg$$

$$Krb = \beta \cdot Mrb$$

$$Kgr = \beta \cdot Mgr$$

$$Kgb = \beta \cdot Mgb$$

$$Kbr = \beta \cdot Mbr$$

$$Kbg = \beta \cdot Mbg$$

(Note; Mrg, Mrb, Mgr, Mgb, Mbr and Mbg are positive constants, or variables of not less than 0 which respectively vary according to at least one of R, G or B)

It is preferable that the Mrg, Mrb, Mgr, Mgb, Mbr and Mbg are not more than 2, and further preferably not more than 0.5. Further, it is preferable that the β is not less than 0 but not more than 1.

It is preferable that the signal processing means further includes a black extension and white extension circuit for converting the gradation values of each color signal of the inputted color image signal. Assuming the gradation value of white (maximum gradation value) is 1, the black extension and white extension circuit converts the gradation values as follows.

a gradation value of greater than 0 but not more than the first threshold is converted to 0 a gradation value of greater than the first threshold and not less than the second threshold but smaller than 1 is converts to 1

Further, the black extension and white extension circuit assigns a gradation value of greater than the first threshold but smaller than the second threshold to a gradation value of greater than 0 but smaller than 1.

With the foregoing arrangement, the contrast (color difference) improves when displaying an image including a half tone, and the image quality becomes further desirable.

Note that, the effect of the black extension and white extension circuit is the same as the conventionally known black extension and white extension circuit; however, the color conversion processing circuit of the present invention has been successful to solve the problems of the conventionally known black extension and white extension circuit.

In some cases, when carrying out the black extension and white extension processing, balance of colors with respect to half tones changes in some cases since the black extension and white extension processing changes the gradation characteristics. The color conversion processing circuit of the present invention is capable of correcting the change. Further, even when the black extension and white extension processing is carried out considering to the balance of colors, the color of a half tone changes with respect to a color display whose contrast is limited, such as a shutter type display (e.g. a liquid crystal display), or a display having a reflective member or a diffuse transmission member provided on a display screen or in the vicinity of the display screen. The color conversion processing means of the present invention is capable of correcting the change of half tones, which is caused due to the black extension and white extension processing.

The black extension and white extension means converts the gradation levels R, G and B of the red signal, the green signal and the blue signal of the inputted color image signal to 0 when the gradation levels are positive values not more than the first threshold X (0<X<1), and converts the gradation levels to 1 when the levels are not less than a second threshold Y (X<Y<1) but smaller than 1. Further, when the gradation levels R, G and B are greater than X but smaller than Y, the black extension and white extension means converts the values to the gradation levels R', G' and B' according to the following functions.

$$R' = o(R)$$

$$G' = p(G)$$

$$B' = q(B)$$

It is further preferable that the o(R), p(G) and q(B) are functions increase from 0 to 1 between X and Y with respect to each of the R, G and B.

As the functions o (R), p (G) and q (B), which increase from 0 to 1, the following equations are suitable.

$$o(R) = \{(R-X)/(Y-X)\}^z$$

$$p(G) = \{(G-X)/(Y-X)\}^z$$

$$q(B) = \{(B-X)/(Y-X)\}^z$$

(Note; z is an arbitrary positive constant)

Further, the functions o (R), p (G) and q (B) may be denoted by the following equations.

$$o(R) = [\sin\{(\pi/2)(R-X)/(Y-X)\}]^z$$

$$p(G) = [\sin\{(\pi/2)(G-X)/(Y-X)\}]^z$$

$$q(B) = [\sin\{(\pi/2)(B-X)/(Y-X)\}]^z$$

(Note; z is an arbitrary positive constant)

Furthermore, the functions o (R), p (G) and q (B) may be denoted by the following equations.

$$o(R) = 1 - [\sin\{(\pi/2) - (\pi/2)(R-X)/(Y-X)\}]^z$$

$$p(G) = 1 - [\sin\{(\pi/2) - (\pi/2)(G-X)/(Y-X)\}]^z$$

$$q(B) = 1 - [\sin\{(\pi/2) - (\pi/2)(B-X)/(Y-X)\}]^z$$

(Note; z is an arbitrary positive constant)

The color display devices with the described arrangements further include sensing means, respectively, such as a light sensor, for sensing brightness of external light, and the black extension means may control one or plural of the X, Y and Z according to the result sensed by the sensing means. Further an adjustment means may be included for adjusting one or plural of the X, Y and Z.

In some cases, the level of reflection on the surface of a color display changes due to a change of external environment, and it also changes the actual contrast of the display. For example, contrast decrease as the brightness of external light increases. In this case, it is effective that one or plural of the X, Y and Z are controlled according to the change of external environment as with the foregoing arrangement. For example, by increasing X and decreasing Y as the brightness of external light increases, contrast will not decrease even when having strong external light, and will not excessively increase even when having weak external light. Thus, a desirable image quality is ensured.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A color display device comprising:
a shutter type color display which has a light shutter for adjusting light from a light source so as to display an image;
signal processing means for processing a color image signal which is made up of plural color signals respectively indicating each gradation level of the plural colors, and for outputting a color image signal which has been processed to the shutter type color display, wherein:
the signal processing means includes color conversion processing means for increasing a gradation level of a color signal having the highest gradation level, while decreasing a gradation level of a color signal having the lowest gradation level, when the gradation levels of the plural color signals are not equal one another.

2. The color display device set forth in claim 1, wherein:
the color image signal is made up of a red signal, a green signal and a blue signal, and
the color conversion processing means converts an inputted color image signal to an outputted color image signal in accordance with the following equations, $$R'=R+Krg(R-G)+Krb(R-B)$$

$$G'=G+Kgr(G-R)+Kgb(G-B)$$

$$B'=B+Kbr(B-R)+Kbg(B-G)$$

where R, G and B respectively indicate gradation levels of the red, green and blue signals of the inputted color image signal, Krg, Krb, Kgr, Kgb, Kbr and Kbg are positive constants, or variables of not less than 0, which vary within a range, and R', G' and B' respectively indicate gradation levels of the red, green and blue signals of the outputted color image signal.

3. The color display device set forth in claim 2, wherein:
Krg, Krb, Kgr, Kgb, Kbr and Kbg are not more than 2.

4. The color display device set forth in claim 2, wherein:
Krg, Krb, Kgr, Kgb, Kbr and Kbg are not more than 0.5.

5. The color display device set forth in claim 2, wherein:
the shutter type color display includes color filters of not thicker than 1.2 μm for displaying a color image.

6. The color display device set forth in claim 2, wherein:
Krg, Krb, Kgr, Kgb, Kbr and Kbg are constants denoted by $1/2^n$ (n is an integer).

7. The color display device set forth in claim 2, wherein:
the color conversion processing means respectively vary Krg, Krb, Kgr, Kgb, Kbr and Kbg according to at least one of R, G and B.

8. The color display device set forth in claim 7, wherein:
the color conversion processing means respectively vary Krg and Krb according to R, vary Kgr and Kgb according to G, and vary Kbr and Kbg according to B.

9. The color display device set forth in claim 8, wherein:
the color conversion processing means (a)vary Krg and Krb to be maximum when R is a gradation level of a half tone, and vary Krg and Krb to be minimum when R is a gradation level of white or black, (b)vary Kgr and Kgb to be maximum when G is a gradation level of a half tone, and vary Kgr and Kgb to be minimum when G is a gradation level of white or black, and (c)vary Kbr and Kbg to be maximum when B is a gradation level of a half tone, and vary Kbr and Kbg to be minimum when B is a gradation level of white or black.

10. The color display device set forth in claim 9, wherein:
Krg, Krb, Kgr, Kgb, Kbr and Kbg are variables denoted by the following equations, $$Krg=\alpha r \cdot Lrg$$

$$Krb=\alpha r \cdot Lrb$$

$$Kgr=\alpha g \cdot Lgr$$

$$Kgb=\alpha g \cdot Lgb$$

$$Kbr=\alpha b \cdot Lbr$$

$$Kbg=\alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
αr, αg and αb are variables denoted by the following equations, $$\alpha r = f0 \cdot R^k \quad (R < 0.5)$$
$$= f0(1-R)^k \quad (R \geq 0.5)$$
$$\alpha g = g0 \cdot G^k \quad (G < 0.5)$$
$$= g0(1-G)^k \quad (G \geq 0.5)$$
$$\alpha b = h0 \cdot B^k \quad (B < 0.5)$$
$$= h0(1-B)^k \quad (B \geq 0.5)$$

where f0, g0, h0 and k are positive constants.

11. The color display device set forth in claim 9, wherein:
Krg, Krb, Kgr, Kgb, Kbr and Kbg are variables denoted by the following equations, $$Krg=\alpha r \cdot Lrg$$

$$Krb=\alpha r \cdot Lrb$$

$Kgr = \alpha g \cdot Lgr$ $Kgb = \alpha g \cdot Lgb$ $Kbr = \alpha b \cdot Lbr$ $Kbg = \alpha b \cdot Lbg$ where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $\alpha r = f0 \cdot \sin^2(\pi \cdot R^k)$ $\alpha g = g0 \cdot \sin^2(\pi \cdot G^k)$ $\alpha b = h0 \cdot \sin^2(\pi \cdot B^k)$ where the f0, g0, h0 and k are positive constants.

12. The color display device set forth in claim 9, wherein:
Krg, Krb, Kgr, Kgb, Kbr and Kbg are variables denoted by the following equations, $Krg = \alpha r \cdot Lrg$ $Krb = \alpha r \cdot Lrb$ $Kgr = \alpha g \cdot Lgr$ $Kgb = \alpha g \cdot Lgb$ $Kbr = \alpha b \cdot Lbr$ $Kbg = \alpha b \cdot Lbg$ where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $\alpha r = f0 \cdot R^k$ $\alpha g = g0 \cdot G^k$ $\alpha b = h0 \cdot B^k$ where the f0, g0, h0 and k are positive constants.

13. The color display device set forth in claim 9, wherein:
Krg, Krb, Kgr, Kgb, Kbr and Kbg are variables denoted by the following equations, $Krg = \alpha r \cdot Lrg$ $Krb = \alpha r \cdot Lrb$ $Kgr = \alpha g \cdot Lgr$ $Kgb = \alpha g \cdot Lgb$ $Kbr = \alpha b \cdot Lbr$ $Kbg = \alpha b \cdot Lbg$ where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $f(R) = f0 \cdot \sin^2\{(\pi/2) \cdot R^k\}$ $g(G) = g0 \cdot \sin^2\{(\pi/2) \cdot G^k\}$ $h(B) = h0 \cdot \sin^2\{(\pi/2) \cdot B^k\}$ where the f0, g0, h0 and k are positive constants.

14. The color display device set forth in claim 7, wherein:
the color conversion processing means respectively vary Krg and Kbg according to G, vary Krb and Kgb according to B, and vary Kgr and Kbr according to R.

15. The color display device set forth in claim 14, wherein:
the color conversion processing means vary Krg and Kbg to be maximum when G is a gradation level of a half tone, and vary Krg and Kbg to be minimum when G is a gradation level of white or black, also, vary Krb and Kgb to be maximum when B is a gradation level of a half tone, and vary Krb and Kgb to be minimum when B is a gradation level of white or black, and further, vary Kgr and Kbr to be maximum when R is a gradation level of a half tone, and vary Kgr and Kbr to be minimum when R is a gradation level of white or black.

16. The color display device set forth in claim 15, wherein:
Krg, Krb, Kgr, Kgb, Kbr and Kbg are variables denoted by the following equations, $Krg = C \cdot \alpha r \cdot \alpha g$ $Krb = C \cdot \alpha r \cdot \alpha b$ $Kgr = C \cdot \alpha g \cdot \alpha r$ $Kgb = C \cdot \alpha g \cdot \alpha b$ $Kbr = C \cdot \alpha b \cdot \alpha r$ $Kbg = C \cdot \alpha b \cdot \alpha g$ where C is a positive constant; and
$\alpha r$, $\alpha g$ and $\alpha b$ are variables denoted by the following equations:

$\alpha r = 2 \times R$ $(R < 0.5)$ $\alpha r = 2 \times (1-R)$ $(R \geq 0.5)$ $\alpha g = 2 \times G$ $(G < 0.5)$ $\alpha g = 2 \times (1-G)$ $(G \geq 0.5)$ $\alpha b = 2 \times B$ $(B < 0.5)$ $\alpha b = 2 \times (1-B)(B \geq 0.5)$.

17. The color display device set forth in claim 2, further comprising:
adjustment means for adjusting Krg, Krb, Kgr, Kgb, Kbr and Kbg, respectively.

18. The color display device set forth in claim 2, further comprising:
sensing means for sensing a change in external environment, wherein:

the color conversion processing means controls the Krg, Krb, Kgr, Kgb, Kbr and Kbg according to a result sensed by the sensing means.

19. The color display device set forth in claim 1, wherein:

the signal processing means further includes a black extension and white extension circuit for converting a gradation level of each color signal of the inputted color image signal when the gradation level of white (maximum gradation level) is 1, (a) to 0 for the gradation level of greater than 0 but not more than a first threshold, (b) to 1 for the gradation level of greater than the first threshold which is not less than a second threshold but smaller than 1, and (c) to a gradation level falling within a range of between 0 and 1 for the gradation level of greater than the first threshold but smaller than the second threshold.

20. A color display device comprising:

a color display having a reflective member or a diffuse transmission member provided on a display screen or in the vicinity of the display screen;

signal processing means for processing a color image signal which is made up of plural color signals respectively indicating each gradation level of the plural colors, and for outputting a color image signal which has been processed to the color display, wherein:

the signal processing means includes color conversion processing means for increasing a gradation level of a color signal having the highest gradation level, while decreasing a gradation level of a color signal having the lowest gradation level, when the gradation levels of the plural color signals are not equal one another.

21. The color display device set forth in claim 20, wherein:

the color image signal is made up of a red signal, a green signal and a blue signal, and the color conversion processing means converts an inputted color image signal to an outputted color image signal in accordance with the following equations, $$R'=R+Krg(R-G)+Krb(R-B)$$

$$G'=G+Kgr(G-R)+Kgb(G-B)$$

$$B'=B+Kbr(B-R)+Kbg(B-G)$$

where R, G and B respectively indicate gradation levels of the red, green and blue signals of the inputted color image signal, Krg, Krb, Kgr, Kgb, Kbr and Kbg are positive constants, or variables of not less than 0, which vary within a range, and R', G' and B' respectively indicate gradation levels of the red, green and blue signals of the outputted color image signal.

22. The color display device set forth in claim 21, wherein:

Krg, Krb, Kgr, Kgb, Kbr and Kbg are not more than 2.

23. The color display device set forth in claim 21, wherein:

Krg, Krb, Kgr, Kgb, Kbr and Kbg are not more than 0.5.

24. The color display device set forth in claim 21, wherein:

the color conversion processing means respectively vary Krg, Krb, Kgr, Kgb, Kbr and Kbg according to at least one of R, G and B.

25. The color display device set forth in claim 24, wherein:

the color conversion processing means respectively vary Krg and Krb according to R, vary Kgr and Kgb according to G, and vary Kbr and Kbg according to B.

26. The color display device set forth in claim 25, wherein:

the color conversion processing means (a)vary Krg and Krb to be maximum when R is a gradation level of a half tone, and vary Krg and Krb to be minimum when R is a gradation level of white or black, (b)vary Kgr and Kgb to be maximum when G is a gradation level of a half tone, and vary Kgr and Kgb to be minimum when G is a gradation level of white or black, and (c)vary Kbr and Kbg to be maximum when B is a gradation level of a half tone, and vary Kbr and Kbg to be minimum when B is a gradation level of white or black.

27. The color display device set forth in claim 26, wherein:

Krg, Krb, Kgr, Kgb, Kbr and Kbg are variables denoted by the following equations, $$Krg=\alpha r \cdot Lrg$$

$$Krb=\alpha r \cdot Lrb$$

$$Kgr=\alpha g \cdot Lgr$$

$$Kgb=\alpha g \cdot Lgb$$

$$Kbr=\alpha b \cdot Lbr$$

$$Kbg=\alpha b \cdot Lbg$$

where Lrg and Lrb are positive constants, or variables of not less than 0 which vary within a range regardless of R;

Lgr and Lgb are positive constants, or variables of not less than 0 which vary within a range regardless of G;

Lbr and Lbg are positive constants, or variables of not less than 0 which vary within a range regardless of B; and $\alpha r$, $\alpha g$ and $\alpha b$ are variables denoted by the following equations, $$\alpha r = f0 \cdot R^k \ (R<0.5) = f0(1-R)^k \ (R \geq 0.5)$$

$$\alpha g = g0 \cdot G^k \ (G<0.5) = g0(1-G)^k \ (G \geq 0.5)$$

$$\alpha b = h0 \cdot B^k \ (B<0.5) = h0(1-B)^k \ (B \geq 0.5)$$

where f0, g0, h0 and k are positive constants.

28. The color display device set forth in claim 26, wherein:

Krg, Krb, Kgr, Kgb, Kbr and Kbg are variables denoted by the following equations, $$Krg=\alpha r \cdot Lrg$$

$$Krb=\alpha r \cdot Lrb$$

$$Kgr=\alpha g \cdot Lgr$$

$$Kgb=\alpha g \cdot Lgb$$

$$Kbr=\alpha b \cdot Lbr$$

$$Kbg=\alpha b \cdot Lbg$$

where Lrg and Lrb are positive constants, or variables of not less than 0 which vary within a range regardless of R;

Lgr and Lgb are positive constants, or variables of not less than 0 which vary within a range regardless of G;

Lbr and Lbg are positive constants, or variables of not less than 0 which vary within a range regardless of B; and αr, αg and αb are variables denoted by the following equations, $$\alpha r = f0 \cdot \sin^2(\pi \cdot R^k)$$

$$\alpha g = g0 \cdot \sin^2(\pi \cdot G^k)$$

$$\alpha b = h0 \cdot \sin^2(\pi \cdot B^k)$$

where the f0, g0, h0 and k are positive constants.

29. The color display device set forth in claim 26, wherein:

Krg, Krb, Kgr, Kgb, Kbr and Kbg are variables denoted by the following equations, $$Krg = \alpha r \cdot Lrg$$

$$Krb = \alpha r \cdot Lrb$$

$$Kgr = \alpha g \cdot Lgr$$

$$Kgb = \alpha g \cdot Lgb$$

$$Kbr = \alpha b \cdot Lbr$$

$$Kbg = \alpha b \cdot Lbg$$

where Lrg and Lrb are positive constants, or variables of not less than 0 which vary within a range regardless of R;

Lgr and Lgb are positive constants, or variables of not less than 0 which vary within a range regardless of G;

Lbr and Lbg are positive constants, or variables of not less than 0 which vary within a range regardless of B; and αr, αg and αb are variables denoted by the following equations, $$\alpha r = f0 \cdot R^k$$

$$\alpha g = g0 \cdot G^k$$

$$\alpha b = h0 \cdot B^k$$

where the f0, g0, h0 and k are positive constants.

30. The color display device set forth in claim 26, wherein:

Krg, Krb, Kgr, Kgb, Kbr and Kbg are variables denoted by the following equations, $$Krg = \alpha r \cdot Lrg$$

$$Krb = \alpha r \cdot Lrb$$

$$Kgr = \alpha g \cdot Lgr$$

$$Kgb = \alpha g \cdot Lgb$$

$$Kbr = \alpha b \cdot Lbr$$

$$Kbg = \alpha b \cdot Lbg$$

where Lrg and Lrb are positive constants, or variables of not less than 0 which vary within a range regardless of R;

Lgr and Lgb are positive constants, or variables of not less than 0 which vary within a range regardless of G;

Lbr and Lbg are positive constants, or variables of not less than 0 which vary within a range regardless of B; and αr, αg and αb are variables denoted by the following equations, $$f(R) = f0 \cdot \sin^2\{(\pi/2) \cdot R^k\}$$

$$g(G) = g0 \cdot \sin^2\{(\pi/2) \cdot G^k\}$$

$$h(B) = h0 \cdot \sin^2\{(\pi/2) \cdot B^k\}$$

where the f0, g0, h0 and k are positive constants.

31. The color display device set forth in claim 24, wherein:

the color conversion processing means respectively vary Krg and Kbg according to G, vary Krb and Kgb according to B, and vary Kgr and Kbr according to R.

32. The color display device set forth in claim 31, wherein:

the color conversion processing means vary Krg and Kbg to be maximum when G is a gradation level of a half tone, and vary Krg and Kbg to be minimum when G is a gradation level of white or black, also, vary Krb and Kgb to be maximum when B is a gradation level of a half tone, and vary Krb and Kgb to be minimum when B is a gradation level of white or black, and further, vary Kgr and Kbr to be maximum when R is a gradation level of a half tone, and vary Kgr and Kbr to be minimum when R is a gradation level of white or black.

33. The color display device set forth in claim 32, wherein:

Krg, Krb, Kgr, Kgb, Kbr and Kbg are variables denoted by the following equations, $$Krg = C \cdot \alpha r \cdot \alpha g$$

$$Krb = C \cdot \alpha r \cdot \alpha b$$

$$Kgr = C \cdot \alpha g \cdot \alpha r$$

$$Kgb = C \cdot \alpha g \cdot \alpha b$$

$$Kbr = C \cdot \alpha b \cdot \alpha r$$

$$Kbg = C \cdot \alpha b \cdot \alpha g$$

where C is a positive constant; and

αr, αg and αb are variables denoted by the following equations:

$$\alpha r = 2 \times R \quad (R < 0.5)$$

$$\alpha r = 2 \times (1-R) \quad (R \geq 0.5)$$

$$\alpha g = 2 \times G \quad (G < 0.5)$$

$$\alpha g = 2 \times (1-G) \quad (G \geq 0.5)$$

$$\alpha b = 2 \times B \quad (B < 0.5)$$

$$\alpha b = 2 \times (1-B) \quad (B \geq 0.5).$$

34. A color display device comprising:

a color plasma display;

signal processing means for processing a color image signal which is made up of plural color signals respectively indicating each gradation level of the plural colors, and for outputting a color image signal which has been processed to the color plasma display, wherein:

the signal processing means includes color conversion processing means for increasing a gradation level of a color signal having the highest gradation level, while decreasing a gradation level of a color signal having the lowest gradation level, when the gradation levels of the plural color signals are not equal one another.

35. The color display device set forth in claim 34, wherein:
the color image signal is made up of a red signal, a green signal and a blue signal, and
the color conversion processing means converts an inputted color image signal to an outputted color image signal in accordance with the following equations, $$R'=R+Krg(R-G)+Krb(R-B)$$
$$G'=G+Kgr(G-R)+Kgb(G-B)$$
$$B'=B+Kbr(B-R)+Kbg(B-G)$$

where R, G and B respectively indicate gradation levels of the red, green and blue signals of the inputted color image signal, Krg, Krb, Kgr, Kgb, Kbr and Kbg are positive constants, or variables of not less than 0, which vary within a range, and R', G' and B' respectively indicate gradation levels of the red, green and blue signals of the outputted color image signal.

36. The color display device set forth in claim 35, wherein:
Krg, Krb, Kgr, Kgb, Kbr and Kbg are not more than 2.

37. The color display device set forth in claim 35, wherein:
Krg, Krb, Kgr, Kgb, Kbr and Kbg are not more than 0.5.

38. The color display device set forth in claim 35, wherein:
the color conversion processing means respectively vary Krg, Krb, Kgr, Kgb, Kbr and Kbg according to at least one of R, G and B.

39. The color display device set forth in claim 38, wherein:
the color conversion processing means respectively vary Krg and Krb according to R, vary Kgr and Kgb according to G, and vary Kbr and Kbg according to B.

40. The color display device set forth in claim 39, wherein:
the color conversion processing means (a) vary Krg and Krb to be maximum when R is a gradation level of a half tone, and vary Krg and Krb to be minimum when R is a gradation level of white or black, (b) vary Kgr and Kgb to be maximum when G is a gradation level of a half tone, and vary Kgr and Kgb to be minimum when G is a gradation level of white or black, and (c) vary Kbr and Kbg to be maximum when B is a gradation level of a half tone, and vary Kbr and Kbg to be minimum when B is a gradation level of white or black.

41. The color display device set forth in claim 40, wherein:
Krg, Krb, Kgr, Kgb, Kbr and Kbg are variables denoted by the following equations, $$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $$\alpha r = f0 \cdot R^k \quad (R < 0.5)$$
$$= f0(1-R)^k \quad (R \geq 0.5)$$
$$\alpha g = g0 \cdot G^k \quad (G < 0.5)$$
$$= g0(1-G)^k \quad (G \geq 0.5)$$
$$\alpha b = h0 \cdot B^k \quad (B < 0.5)$$
$$= h0(1-B)^k \quad (B \geq 0.5)$$

where f0, g0, h0 and k are positive constants.

42. The color display device set forth in claim 40, wherein:
Krg, Krb, Kgr, Kgb, Kbr and Kbg are variables denoted by the following equations, $$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $$\alpha r = f0 \cdot \sin^2(\pi \cdot R^k)$$
$$\alpha g = g0 \cdot \sin^2(\pi \cdot G^k)$$
$$\alpha b = h0 \cdot \sin^2(\pi \cdot B^k)$$

where the f0, g0, h0 and k are positive constants.

43. The color display device set forth in claim 40, wherein:
Krg, Krb, Kgr, Kgb, Kbr and Kbg are variables denoted by the following equations, $$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;

Lbr and Lbg are positive constants, or variables of not less than 0 which vary within a range regardless of B; and
αr, αg and αb are variables denoted by the following equations, $$\alpha r = f0 \cdot R^k$$

$$\alpha g = g0 \cdot G^k$$

$$\alpha b = h0 \cdot B^k$$

where the f0, g0, h0 and k are positive constants.

44. The color display device set forth in claim 40, wherein:
Krg, Krb, Kgr, Kgb, Kbr and Kbg are variables denoted by the following equations, $$Krg = \alpha r \cdot Lrg$$

$$Krb = \alpha r \cdot Lrb$$

$$Kgr = \alpha g \cdot Lgr$$

$$Kgb = \alpha g \cdot Lgb$$

$$Kbr = \alpha b \cdot Lbr$$

$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
αr, αg and αb are variables denoted by the following equations, $$f(R) = f0 \cdot \mathrm{Sin}^2\{(\pi/2) \cdot R^k\}$$

$$g(G) = g0 \cdot \mathrm{Sin}^2\{(\pi/2) \cdot G^k\}$$

$$h(B) = h0 \cdot \mathrm{Sin}^2\{(\pi/2) \cdot B^k\}$$

where the f0, g0, h0 and k are positive constants.

45. The color display device set forth in claim 38, wherein:
the color conversion processing means respectively vary Krg and Kbg according to G, vary Krb and Kgb according to B, and vary Kgr and Kbr according to R.

46. The color display device set forth in claim 45, wherein:
the color conversion processing means vary Krg and Kbg to be maximum when G is a gradation level of a half tone, and vary Krg and Kbg to be minimum when G is a gradation level of white or black, also, vary Krb and Kgb to be maximum when B is a gradation level of a half tone, and vary Krb and Kgb to be minimum when B is a gradation level of white or black, and further, vary Kgr and Kbr to be maximum when R is a gradation level of a half tone, and vary Kgr and Kbr to be minimum when R is a gradation level of white or black.

47. The color display device set forth in claim 46, wherein:
Krg, Krb, Kgr, Kgb, Kbr and Kbg are variables denoted by the following equations, $$Krg = C \cdot \alpha r \cdot \alpha g$$

$$Krb = C \cdot \alpha r \cdot \alpha b$$

$$Kgr = C \cdot \alpha g \cdot \alpha r$$

$$Kgb = C \cdot \alpha g \cdot \alpha b$$

$$Kbr = C \cdot \alpha b \cdot \alpha r$$

$$Kbg = C \cdot \alpha b \cdot \alpha g$$

where C is a positive constant; and
αr, αg and αb are variables denoted by the following equations:

$$\alpha r = 2 \times R \quad (R < 0.5)$$

$$\alpha r = 2 \times (1-R) \quad (R \geq 0.5)$$

$$\alpha g = 2 \times G \quad (G < 0.5)$$

$$\alpha g = 2 \times (1-G) \quad (G \geq 0.5)$$

$$\alpha b = 2 \times B \quad (B < 0.5)$$

$$\alpha b = 2 \times (1-B) \quad (B \geq 0.5).$$

48. A color display device comprising:
a color field emission display;
signal processing means for processing a color image signal which is made up of plural color signals respectively indicating each gradation level of the plural colors, and for outputting a color image signal which has been processed to the color field emission display, wherein:
the signal processing means includes color conversion processing means for increasing a gradation level of a color signal having the highest gradation level, while decreasing a gradation level of a color signal having the lowest gradation level, when the gradation levels of the plural color signals are not equal one another.

49. The color display device set forth in claim 48, wherein:
the color image signal is made up of a red signal, a green signal and a blue signal, and
the color conversion processing means converts an inputted color image signal to an outputted color image signal in accordance with the following equations, $$R' = R + Krg(R-G) + Krb(R-B)$$

$$G' = G + Kgr(G-R) + Kgb(G-B)$$

$$B' = B + Kbr(B-R) + Kbg(B-G)$$

where R, G and B respectively indicate gradation levels of the red, green and blue signals of the inputted color image signal, Krg, Krb, Kgr, Kgb, Kbr and Kbg are positive constants, or variables of not less than 0, which vary within a range, and R', G' and B' respectively indicate gradation levels of the red, green and blue signals of the outputted color image signal.

50. The color display device set forth in claim 49, wherein:
Krg, Krb, Kgr, Kgb, Kbr and Kbg are not more than 2.

51. The color display device set forth in claim 49, wherein:
Krg, Krb, Kgr, Kgb, Kbr and Kbg are not more than 0.5.

52. The color display device set forth in claim 49, wherein:
the color conversion processing means respectively vary Krg, Krb, Kgr, Kgb, Kbr and Kbg according to at least one of R, G and B.

53. The color display device set forth in claim 52, wherein:
the color conversion processing means respectively vary Krg and Krb according to R, vary Kgr and Kgb according to G, and vary Kbr and Kbg according to B.

54. The color display device set forth in claim 53, wherein:
the color conversion processing means (a) vary Krg and Krb to be maximum when R is a gradation level of a half tone, and vary Krg and Krb to be minimum when R is a gradation level of white or black, (b) vary Kgr and Kgb to be maximum when G is a gradation level of a half tone, and vary Kgr and Kgb to be minimum when G is a gradation level of white or black, and (c) vary Kbr and Kbg to be maximum when B is a gradation level of a half tone, and vary Kbr and Kbg to be minimum when B is a gradation level of white or black.

55. The color display device set forth in claim 54, wherein:
Krg, Krb, Kgr, Kgb, Kbr and Kbg are variables denoted by the following equations, $$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $$\alpha r = f0 \cdot R^k \quad (R < 0.5)$$
$$= f0(1-R)^k \quad (R \geq 0.5)$$
$$\alpha g = g0 \cdot G^k \quad (G < 0.5)$$
$$= g0(1-G)^k \quad (G \geq 0.5)$$
$$\alpha b = h0 \cdot B^k \quad (B < 0.5)$$
$$= h0(1-B)^k \quad (B \geq 0.5)$$

where f0, g0, h0 and k are positive constants.

56. The color display device set forth in claim 54, wherein:
Krg, Krb, Kgr, Kgb, Kbr and Kbg are variables denoted by the following equations, $$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $$\alpha r = f0 \cdot \sin^2(\pi \cdot R^k)$$
$$\alpha g = g0 \cdot \sin^2(\pi \cdot G^k)$$
$$\alpha b = h0 \cdot \sin^2(\pi \cdot B^k)$$

where the f0, g0, h0 and k are positive constants.

57. The color display device set forth in claim 54, wherein:
Krg, Krb, Kgr, Kgb, Kbr and Kbg are variables denoted by the following equations, $$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and
$\alpha r$, $\alpha g$ and $\alpha b$ are variables denoted by the following equations, $$\alpha r = f0 \cdot R^k$$
$$\alpha g = g0 \cdot G^k$$
$$\alpha b = h0 \cdot B^k$$

where the f0, g0, h0 and k are positive constants.

58. The color display device set forth in claim 54, wherein:
Krg, Krb, Kgr, Kgb, Kbr and Kbg are variables denoted by the following equations, $$Krg = \alpha r \cdot Lrg$$
$$Krb = \alpha r \cdot Lrb$$
$$Kgr = \alpha g \cdot Lgr$$
$$Kgb = \alpha g \cdot Lgb$$
$$Kbr = \alpha b \cdot Lbr$$
$$Kbg = \alpha b \cdot Lbg$$

where Lrg and Lrb are positive constants, or variables of not less than 0 which vary within a range regardless of R;
Lgr and Lgb are positive constants, or variables of not less than 0 which vary within a range regardless of G;
Lbr and Lbg are positive constants, or variables of not less than 0 which vary within a range regardless of B; and αr, αg and αb are variables denoted by the following equations, $$f(R) = f0 \cdot \operatorname{Sin}^2\{(\pi/2) \cdot R^k\}$$

$$g(G) = g0 \cdot \operatorname{Sin}^2\{(\pi/2) \cdot G^k\}$$

$$h(B) = h0 \cdot \operatorname{Sin}^2\{(\pi/2) \cdot B^k\}$$

where the f0, g0, h0 and k are positive constants.

59. The color display device set forth in claim 52, wherein:

the color conversion processing means respectively vary Krg and Kbg according to G, vary Krb and Kgb according to B, and vary Kgr and Kbr according to R.

60. The color display device set forth in claim 59, wherein:

the color conversion processing means vary Krg and Kbg to be maximum when G is a gradation level of a half tone, and vary Krg and Kbg to be minimum when G is a gradation level of white or black, also, vary Krb and Kgb to be maximum when B is a gradation level of a half tone, and vary Krb and Kgb to be minimum when B is a gradation level of white or black, and further, vary Kgr and Kbr to be maximum when R is a gradation level of a half tone, and vary Kgr and Kbr to be minimum when R is a gradation level of white or black.

61. The color display device set forth in claim 59, wherein:

Krg, Krb, Kgr, Kgb, Kbr and Kbg are variables denoted by the following equations, $$Krg = C \cdot \alpha r \cdot \alpha g$$

$$Krb = C \cdot \alpha r \cdot \alpha b$$

$$Kgr = C \cdot \alpha g \cdot \alpha r$$

$$Kgb = C \cdot \alpha g \cdot \alpha b$$

$$Kbr = C \cdot \alpha b \cdot \alpha r$$

$$Kbg = C \cdot \alpha b \cdot \alpha g$$

where C is a positive constant; and

αr, αg and αb are variables denoted by the following equations:

$$\alpha r = 2 \times R \quad (R < 0.5)$$

$$\alpha r = 2 \times (1-R) \quad (R \geq 0.5)$$

$$\alpha g = 2 \times G \quad (G < 0.5)$$

$$\alpha g = 2 \times (1-G) \quad (G \geq 0.5)$$

$$\alpha b = 2 \times B \quad (B < 0.5)$$

$$\alpha b = 2 \times (1-B) \quad (B \geq 0.5).$$

* * * * *